US012399458B2

(12) United States Patent
Uchida et al.

(10) Patent No.: US 12,399,458 B2
(45) Date of Patent: Aug. 26, 2025

(54) IMAGE FORMING APPARATUS

(71) Applicant: CANON KABUSHIKI KAISHA, Tokyo (JP)

(72) Inventors: Yuki Uchida, Chiba (JP); Takahiro Ito, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/494,076

(22) Filed: Oct. 25, 2023

(65) Prior Publication Data

US 2024/0152089 A1 May 9, 2024

(30) Foreign Application Priority Data

Nov. 4, 2022 (JP) ................................ 2022-177475

(51) Int. Cl.
*G03G 21/16* (2006.01)

(52) U.S. Cl.
CPC ................................ *G03G 21/1633* (2013.01)

(58) Field of Classification Search
CPC .................... G03G 21/1633; G03G 2221/169
See application file for complete search history.

(56) References Cited

U.S. PATENT DOCUMENTS

2014/0016962 A1 1/2014 Sato
2016/0098007 A1* 4/2016 Doi .................... G03G 21/1633 49/394
2016/0102488 A1* 4/2016 Doi .................... G03G 21/1633 49/350

FOREIGN PATENT DOCUMENTS

JP H1026922 A 1/1998
JP H1191199 A 4/1999
JP 2014021135 A 2/2014
JP 2019053100 A 4/2019

* cited by examiner

*Primary Examiner* — Sandra Brase
(74) *Attorney, Agent, or Firm* — ROSSI, KIMMS & McDOWELL LLP

(57) ABSTRACT

An image forming apparatus includes an image forming unit, a casing, a door, a switching portion, an operating portion, and an operation regulating portion. The operating portion is moved to a first operating position in which the switching portion is set to the first state and, a second operating position in which the switching portion is set to the second state. The operation regulating portion is switched between a regulating state in which the operating portion is regulated not to move from the second operating position to the first operating position, and an allowable state in which the operating portion is allowable to move from the second operating position to the first operating position. When the operating portion is operated to be moved from the first operating position to the second operating position, the operation regulating portion is changed to the regulating state.

14 Claims, 32 Drawing Sheets

IMAGE FORMING APPARATUS

BACKGROUND OF THE INVENTION

Field of the Invention

The present invention relates to image forming apparatuses adopting an electrophotographic system, such as a facsimile, a printer, or a multifunction machine having such functions.

Description of the Related Art

Hitherto, in image forming apparatuses, a configuration in which a conveyance path is formed as an openable/closable cover is adopted to cope with jamming of sheets, hereinafter referred to as sheet jamming, in the conveyance path through which sheets are conveyed. In addition to removing the sheets that caused sheet jamming, the cover is opened and closed when attaching, detaching or replacing components and units, such as an intermediate transfer belt, a fixing unit, and a conveyance roller, that are arranged along the conveyance path. A configuration in which an opening angle of a cover is set to two stages, which are a small angle and a large angle, has been proposed (refer to Japanese Patent Application Laid-Open Publication No. 2014-21135).

The above-mentioned configuration proposes a two-action system as a unit for switching the opening angles of the cover, wherein the cover is lifted to a point where the opening angles are switched, and while the cover is held in this state, a member supporting the cover is operated to switch angles.

However, according to the image forming apparatus disclosed in Japanese Patent Application Laid-Open Publication No. 2014-21135, when opening the cover from the small angle to the large angle, the user is required to lift the support arm while guiding a guide shaft from the small angle path to the large angle path. Therefore, in order to open the cover from the small angle to the large angle, the user must lift the support arm while performing operation, such that the operability is deteriorated. Since the operability is not good, the opening of the cover to the large angle may only be performed by operators having special skills. Therefore, simplification of the operability was desired to allow general users to operate the cover.

The present technique provides an image forming apparatus capable of simplifying the operability of opening the cover in two stages.

SUMMARY OF THE INVENTION

According to a first aspect of the present invention, an image forming apparatus includes an image forming unit configured to form an image on a sheet, a casing accommodating the image forming unit, a door configured to be opened and closed by being rotated with respect to the casing, and configured to be rotated to a first opened position where the door is inclined by a first angle with respect to a closed position where the casing is closed, and to a second opened position where the door is inclined by a second angle that is greater than the first angle with respect to the closed position, a switching portion configured to be switched between a first state in which the door is rotatable from the closed position to the first opened position, and a second state in which the door is rotatable at least from the first opened position to the second opened position, an operating portion configured to be moved to a first operating position in which the switching portion is set to the first state and, a second operating position in which the switching portion is set to the second state, and an operation regulating portion configured to be switched between a regulating state in which the operating portion is regulated not to move from the second operating position to the first operating position, and an allowable state in which the operating portion is allowable to move from the second operating position to the first operating position. In a state where the operating portion is operated to be moved from the first operating position to the second operating position, the operation regulating portion is changed to the regulating state.

Further features of the present invention will become apparent from the following description of exemplary embodiments with reference to the attached drawings.

DESCRIPTION OF THE EMBODIMENTS

First Embodiment

A first embodiment of the present invention will be described in detail below with reference to FIGS. 1 to 11. In the present embodiment, a tandem-type full-color printer is described as an example of an image forming apparatus 1. However, the present invention is not limited to a tandem-type image forming apparatus 1, and it may be other types of image forming apparatuses, and it may even be applied not only to full-color printers but also to monochrome, mono-color, and inkjet printers.

Image Forming Apparatus

Figure 1:
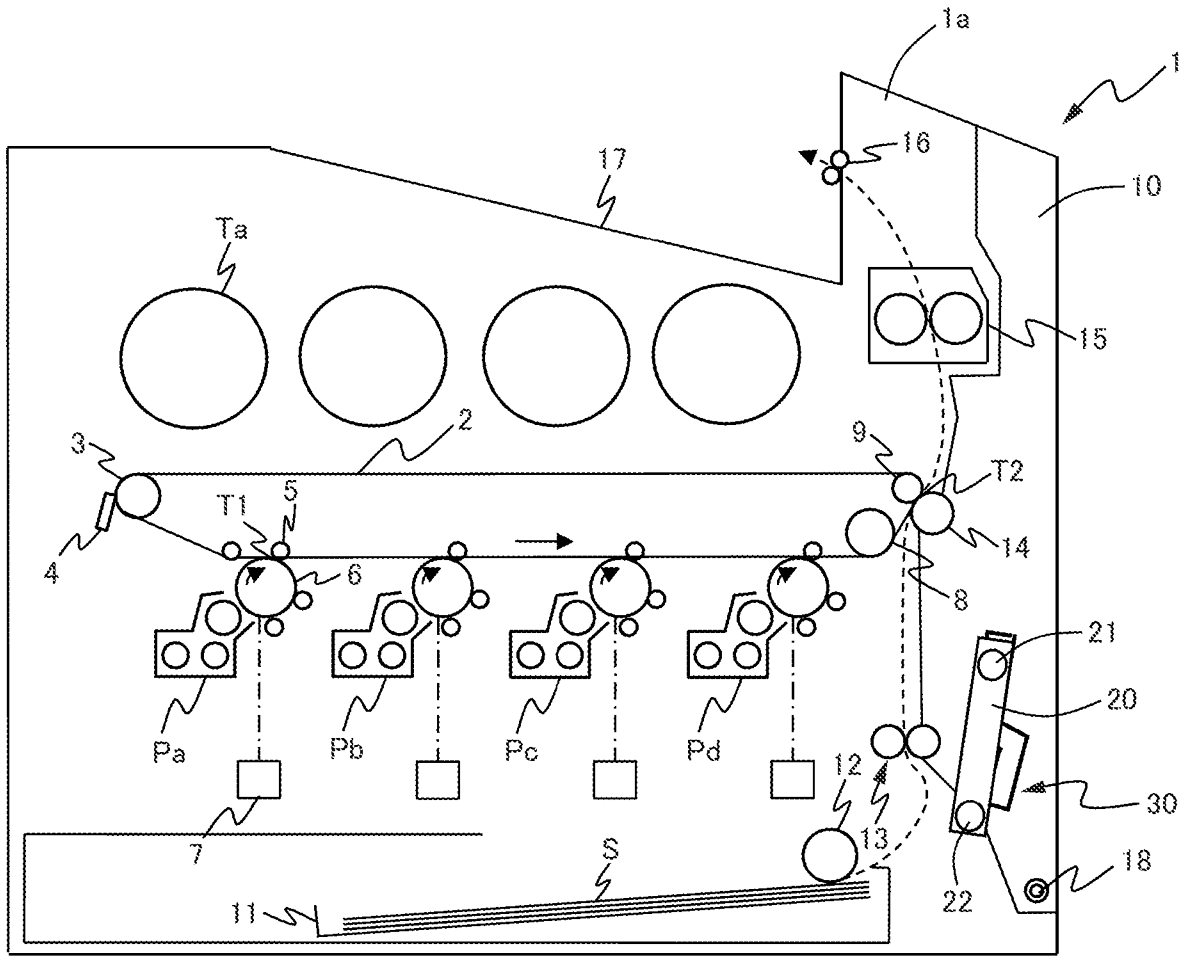
FIG. 1 is a cross-sectional view illustrating a general configuration of an image forming apparatus according to a first embodiment.

At first, a general configuration of the image forming apparatus 1 according to a first embodiment will be described with reference to FIG. 1. FIG. 1 is a schematic drawing of a color image forming apparatus using an electrophotographic system. The image forming apparatus 1 is an intermediate transfer tandem-type image forming apparatus in which four color image forming units of yellow (Y), magenta (M), cyan (C), and black (Bk) are aligned above the intermediate transfer belt 2. A direction vertical to the sheet surface in FIG. 1 is a front-rear direction of the apparatus.

The image forming apparatus 1 includes a casing 1*a*, and process cartridges Pa, Pb, Pc, and Pd stored in the casing 1*a* for forming toner images. The process cartridges Pa, Pb, Pc, and Pd are examples of an image forming portion and form an image on a sheet. An apparatus body includes the casing 1*a* and the process cartridges Pa, Pb, Pc, and Pd. The process cartridges Pa, Pb, Pc, and Pd use toner of different colors, which are yellow, magenta, cyan, and black, and they adopt similar configurations except for the different toner colors. Therefore, a process cartridge Pa of yellow toner is described below as a representative example.

In FIG. 1, a surface of a photosensitive member 6 that is driven to rotate in a clockwise direction is exposed and scanned by an exposing unit 7 driven based on an image information signal, and an electrostatic latent image is formed thereby. The electrostatic latent image is developed by the process cartridges Pa, Pb, Pc, and Pd as a toner image. Thereafter, predetermined pressurizing force and primary transfer bias are applied by a primary transfer apparatus T1, and a toner image is formed on the intermediate transfer belt 2. A primary transfer bias roller 5 and a transfer cleaning apparatus 4 are in contact with the intermediate transfer belt 2. Further, the intermediate transfer belt 2 is an endless belt that is stretched across a secondary transfer inner roller 9, a tension roller 3, and a secondary transfer upstream roller 8 that also function to transmit drive to the intermediate transfer belt 2, and that is driven to be conveyed in a counterclockwise direction in the drawing.

The primary transfer bias roller 5 forms a primary transfer nip by nipping the intermediate transfer belt 2 with the photosensitive member 6. An image forming process is performed at a timing at which a toner image is superposed on a color toner image that has been primarily transferred upstream on the intermediate transfer belt 2 by sequentially passing through the primary transfer nip, along with the conveyance of the intermediate transfer belt 2. Four color toner images are formed on the intermediate transfer belt 2 and conveyed to a secondary transfer unit T2.

A sheet S, i.e., storage medium, that has been stacked and stored in a sheet cassette 11 is fed one by one by a feed roller 12, and skewing of the sheet S is corrected by a registration roller 13 before the sheet S is transmitted at an appropriate timing to the secondary transfer unit T2. In the secondary transfer unit T2, a nip is formed by interposing the intermediate transfer belt 2 between the secondary transfer inner roller 9 and a secondary transfer outer roller 14, and the four-color toner image formed on the intermediate transfer belt 2 is secondarily transferred to the sheet S. The sheet S after secondary transfer is conveyed to a fixing unit 15, where the toner image on the sheet S is fixed, and the sheet S is discharged to an exterior of the apparatus by a sheet discharge roller pair 16 and sequentially stacked on a sheet discharge tray 17.

General Configuration of Opening/Closing Mechanism of Cover

Figure 2A:
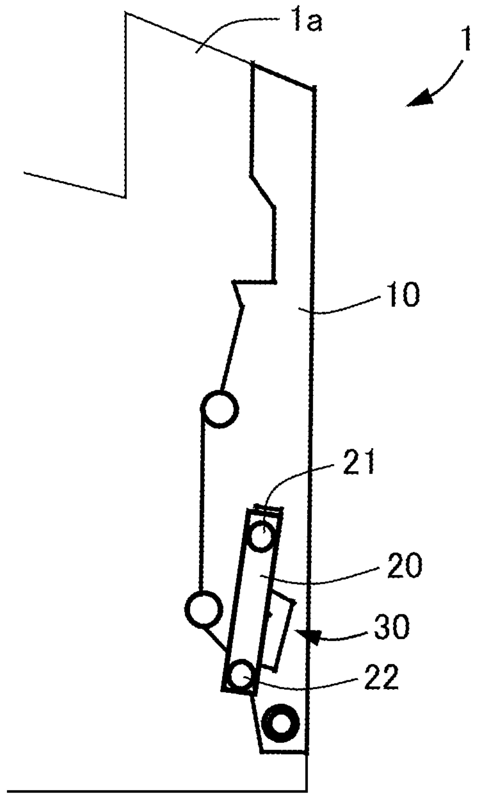
FIG. 2A is a front view of a cover in a state where the cover according to the first embodiment is positioned at a closed position.
Figure 2B:
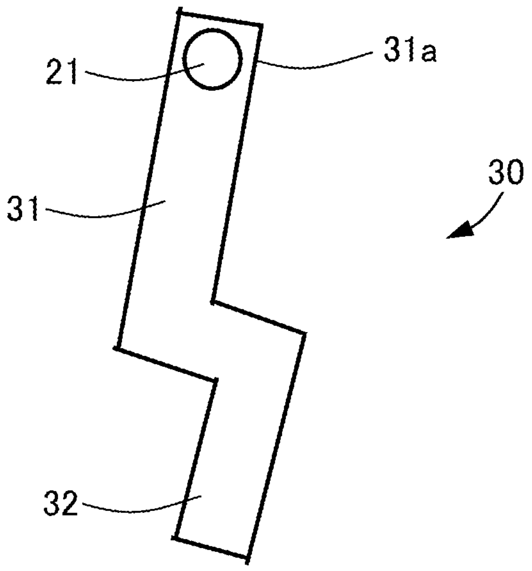
FIG. 2B is a front view of a guide portion in a state where the cover according to the first embodiment is positioned at the closed position.
Figure 3A:
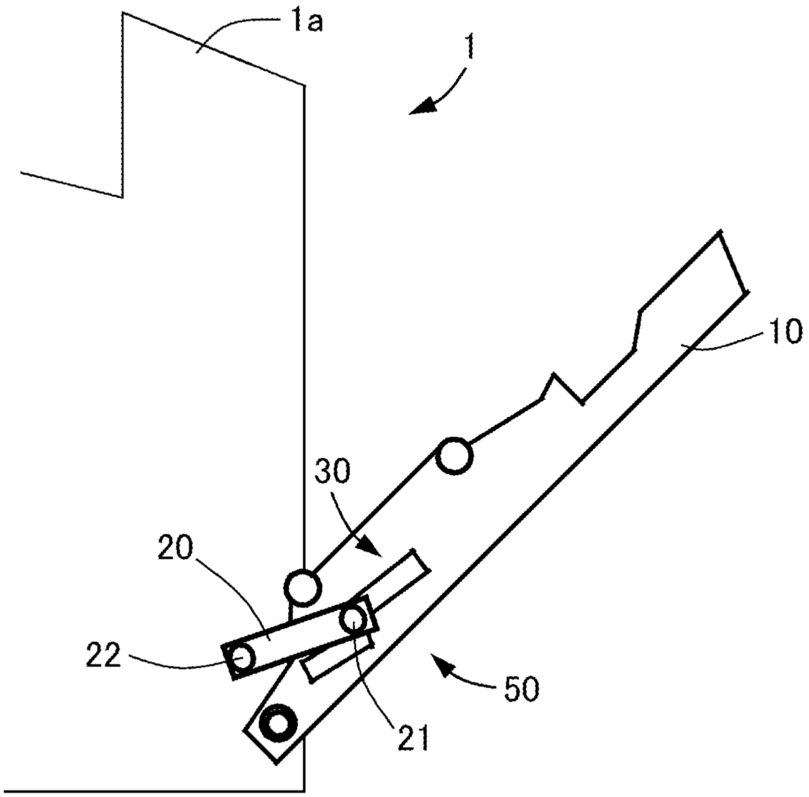
FIG. 3A is a front view of the cover in a state where the cover according to the first embodiment is positioned at a first opened position.
Figure 3B:
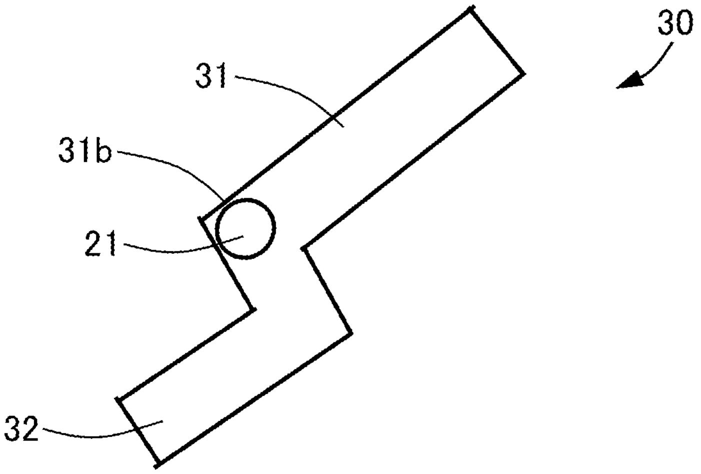
FIG. 3B is a front view of the guide portion in a state where the cover according to the first embodiment is positioned at the first opened position.
Figure 4A:
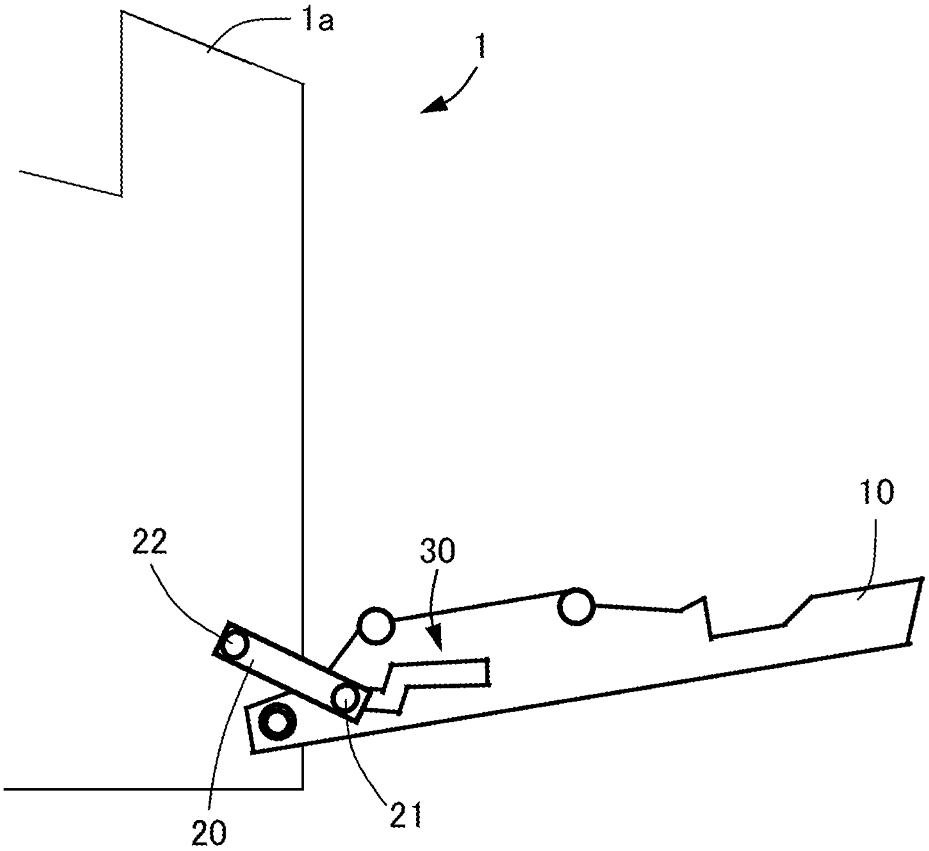
FIG. 4A is a front view of the cover in a state where the cover according to the first embodiment is positioned at a second opened position.
Figure 4B:
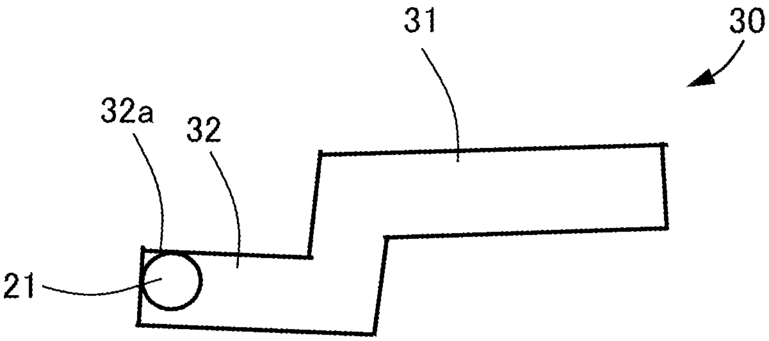
FIG. 4B is a front view of the guide portion in a state where the cover according to the first embodiment is positioned at the second opened position.
Figure 5A:
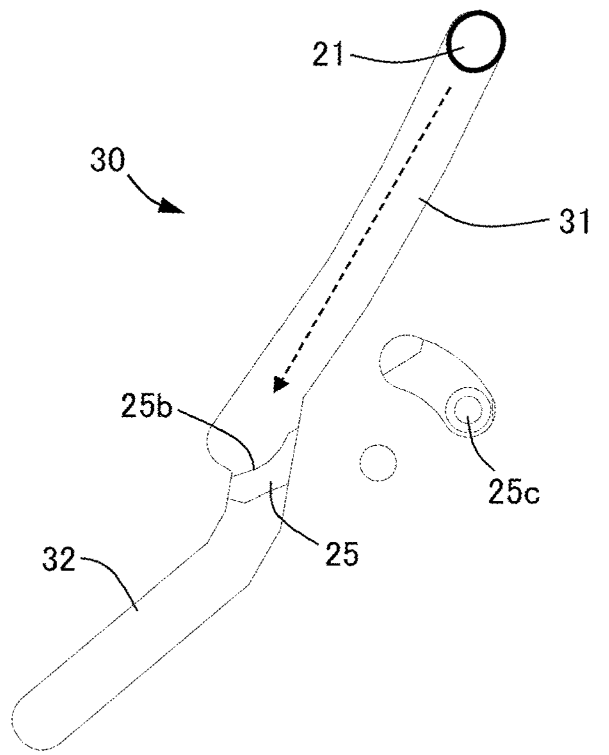
FIG. 5A is a view illustrating the guide portion viewed from one side of the guide portion in a state where the cover according to the first embodiment is positioned at the closed position.
Figure 5B:
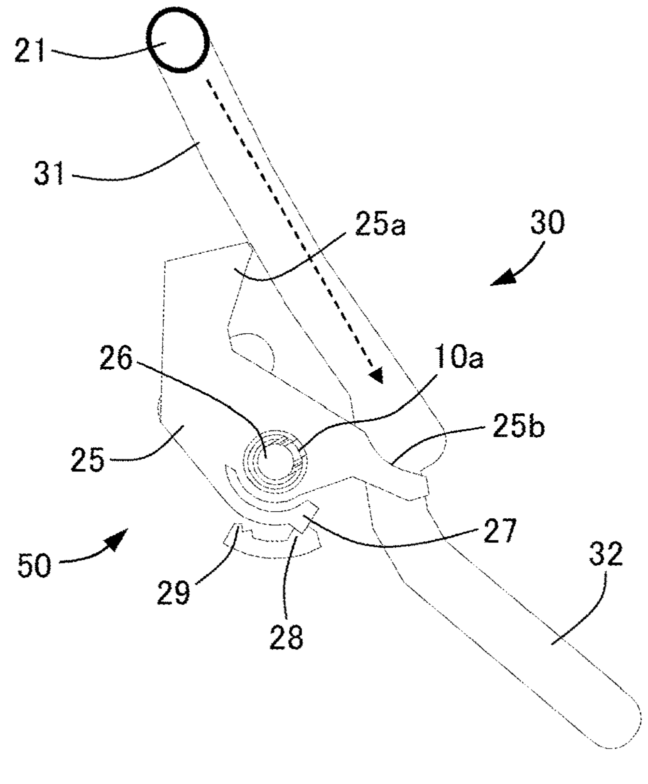
FIG. 5B is a view illustrating the guide portion viewed from the other side of the guide portion in a state where the cover according to the first embodiment is positioned at the closed position.
Figure 6A:
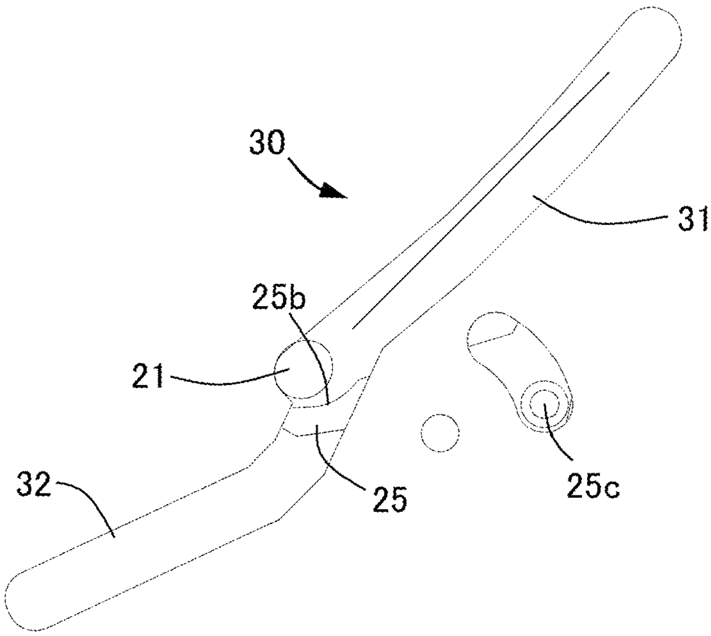
FIG. 6A is a view illustrating the guide portion viewed from one side of the guide portion in a state where the cover according to the first embodiment is positioned at the first opened position.
Figure 6B:
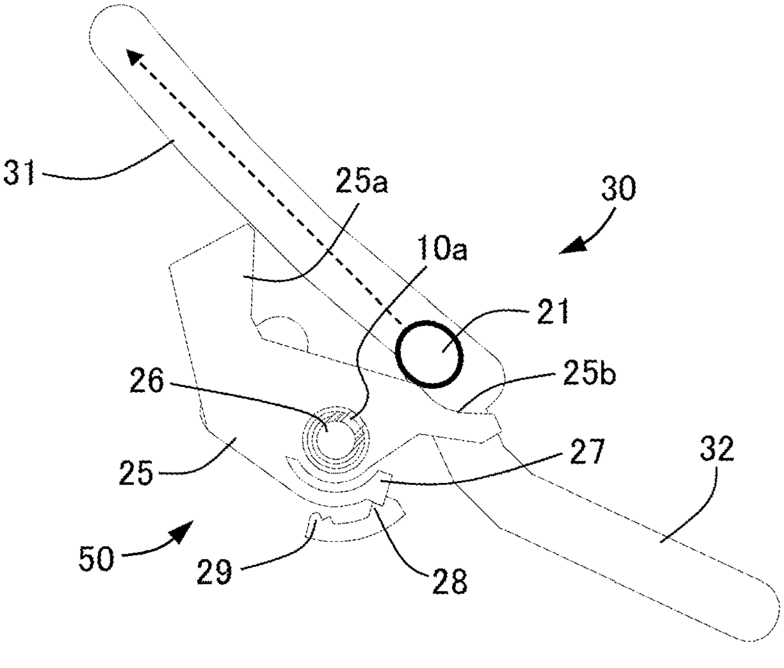
FIG. 6B is a view illustrating the guide portion viewed from the other side of the guide portion in a state where the cover according to the first embodiment is positioned at the first opened position.
Figure 7A:
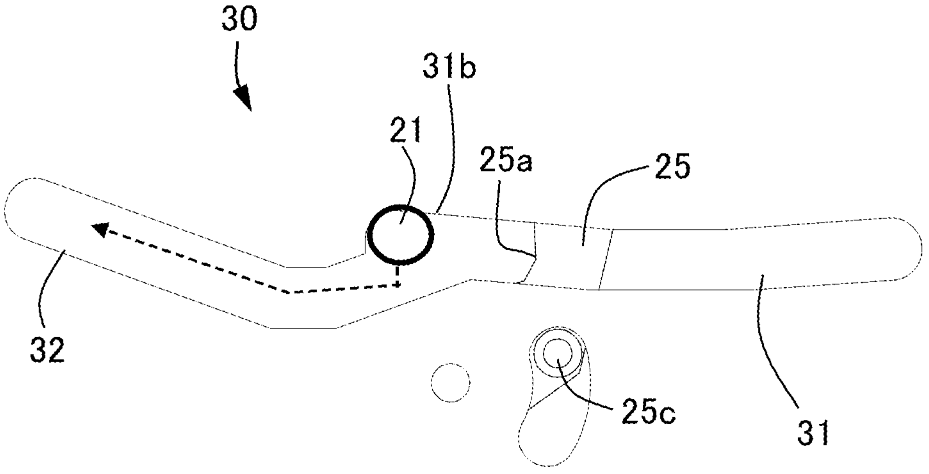
FIG. 7A is a view illustrating the guide portion viewed from one side of the guide portion in a state where the cover according to the first embodiment is positioned at the first opened position and the holding portion has been operated.
Figure 7B:
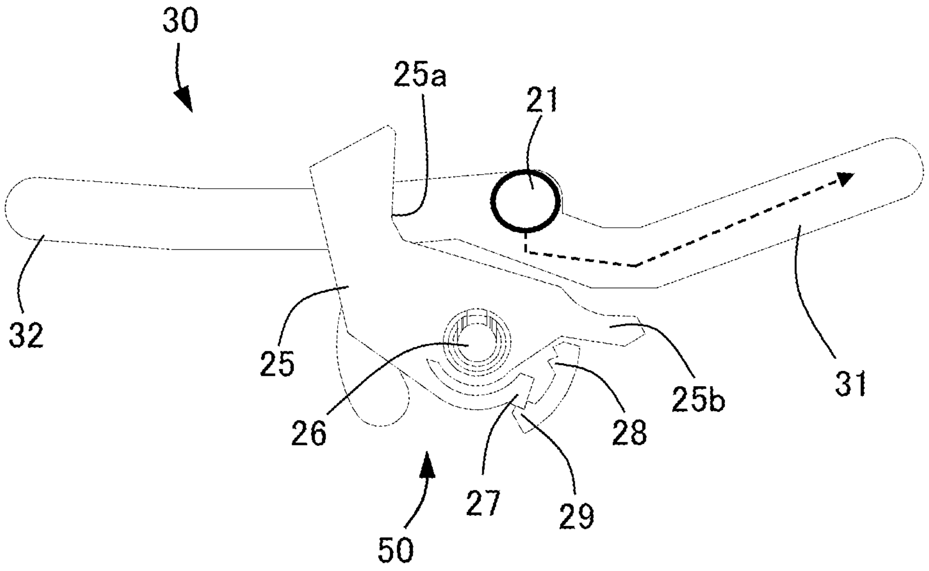
FIG. 7B is a view illustrating the guide portion viewed from the other side of the guide portion in a state where the cover according to the first embodiment is positioned at the first opened position and the holding portion has been operated.
Figure 8A:
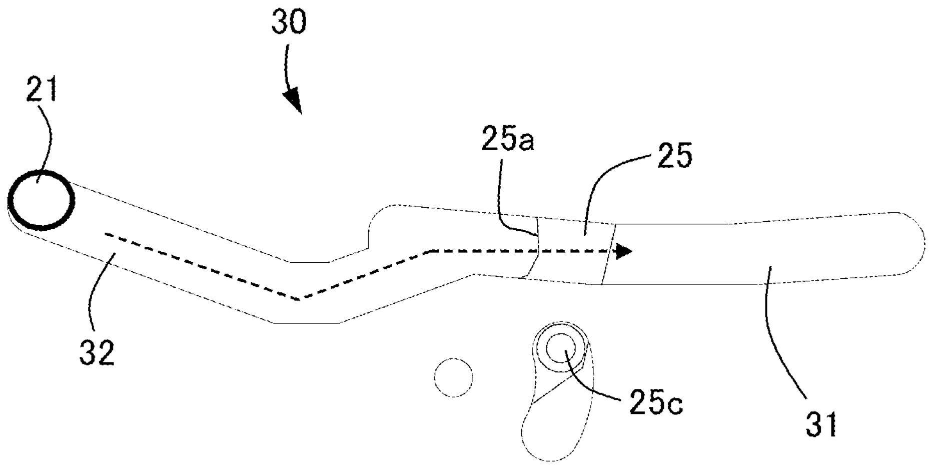
FIG. 8A is a view illustrating the guide portion viewed from one side of the guide portion in a state where the cover according to the first embodiment is positioned at the second opened position.
Figure 8B:
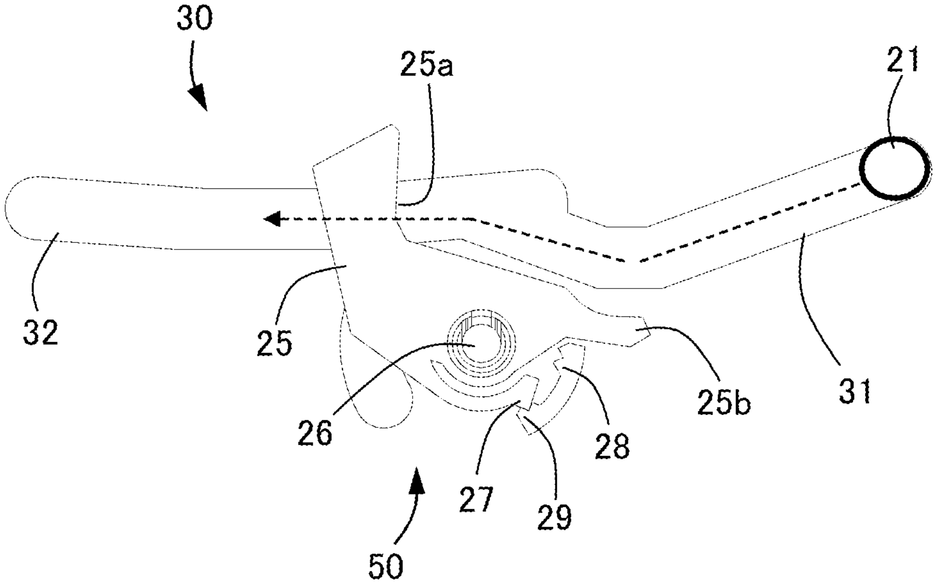
FIG. 8B is a view illustrating the guide portion viewed from the other side of the guide portion in a state where the cover according to the first embodiment is positioned at the second opened position.

Next, an opening/closing mechanism of a cover 10 will be described. An outline of the opening/closing mechanism for setting an angle, an orientation, and a position of the cover 10 will be described. FIG. 2A is an explanatory view of a closed position state, i.e., sheet conveyable state, or standby state, of the opening/closing mechanism according to the present embodiment, FIG. 3A is an explanatory view of a first opened position, i.e., jammed sheet removable position, of the opening/closing mechanism, and FIG. 4A is an explanatory view of a second opened position, i.e., unit replaceable position, of the opening/closing mechanism. FIGS. 2B, 3B, and 4B respectively illustrate a position of a slide shaft 21 in a guide portion 30 corresponding to FIGS. 2A, 3A, and 4A.

Jamming of the sheet S may occur within the conveyance path at a right side of the image forming apparatus 1, such that the cover 10 serving as one example of a door that may be used to open and close this part of the apparatus is disposed on the casing 1*a*. The cover rotation shaft 18 is provided on the cover 10, and by having the image forming apparatus 1 engage with the cover rotation shaft 18, the cover 10 is supported rotatably about a horizontal axis in a front-rear direction. That is, according to the present embodiment, the cover 10 constitutes a right side wall portion of the casing 1*a* in the closed position, and it is disposed rotatably about the cover rotation shaft 18 in the horizontal direction at a lower part of the cover 10. The cover 10 is designed to have its angle, position, and orientation determined by a support arm 20, and the cover 10 moves arbitrarily among three positions, which are a closed position, a first opened position, and a second opened position. The closed position is a position where the cover 10 is stored in the image forming apparatus 1, which is referred to as a sheet conveyable state or a standby state. The first opened position is a position where the operator can remove jammed sheets, which is referred to as a jammed sheet removable position. The second opened position is a position where the operator can replace units, which is referred to as a unit replaceable position. That is, the cover 10 is disposed in an openable and closable manner by rotating about the casing 1*a*, and it is configured to be rotated between a first opened position which is inclined by a first angle with respect to a closed position where the casing 1*a* is closed and a second opened position which is inclined by a second angle greater than the first angle with respect to the closed position.

The support arm 20 has the slide shaft 21 disposed on a first end portion so as to connect the support arm 20 and the cover 10 and is rotatably supported at a second end portion by a rotation shaft 22 to the casing 1*a* of the image forming apparatus 1. The cover 10 includes the guide portion 30 that guides the support arm 20. The guide portion 30 includes two paths, which are a first path 31, i.e., first area, and a second path 32, i.e., second area. An angle, i.e., position or orientation, of the support arm 20 is determined by the position of the slide shaft 21 on the guide portion 30, and simultaneously, an angle of the cover 10 is also determined. That is, the support arm 20 is an example of a support member that is disposed swingably on the casing 1*a*, that includes the slide shaft 21 serving as a guided portion guided by the guide portion 30, and that can support the cover 10 in an inclined state on the casing 1*a*.

Closed Position, i.e., Sheet Conveyable State or Standby State

As illustrated in FIGS. 2A and 2B, when the slide shaft 21 of the support arm 20 is positioned on an end portion 31*a* of the first path 31, the support arm 20 is approximately parallel to the cover 10 in an approximately vertical direction, and the cover 10 is in a closed position stored in the image forming apparatus 1. In this state, by providing a lock mechanism (not shown) to an appropriate position by which the cover 10 is locked to the image forming apparatus 1, the slide shaft 21 will not receive any load from the cover 10. In the closed position, which is the position taken during most of the period of use of the image forming apparatus 1, the slide shaft 21 will not receive load from the cover 10, such that it is not vulnerable to deterioration over time, such as creep deformation.

First Opened Position, i.e., Jammed Sheet Removable Position

As illustrated in FIGS. 3A and 3B, when the slide shaft 21 of the support arm 20 is positioned at an end portion 31*b* opposite to the closed position of the first path 31, the support arm 20 is in a balanced state by the rotation shaft 22 and the slide shaft 21 positioned at the end portion 31*b*. The cover 10 is positioned at the first opened position by the cover rotation shaft 18 and the slide shaft 21 positioned at the end portion 31*b* being balanced. The first opened position is required to provide an open space through which the operator can remove jammed sheets, and a first angle which is an opening angle thereof is preferably set, for example, to an angle of 45 degrees or greater and smaller than the angle of a second opened position. In the present embodiment, the first angle is set to 45 degrees. The first angle is not limited to 45 degrees or greater, and it can be set within the range of 30 to 60 degrees, for example.

Second Opened Position, i.e., Unit Replaceable Position

As illustrated in FIGS. 4A and 4B, when the slide shaft 21 of the support arm 20 is positioned at an end portion 32*a* of the second path 32, the support arm 20 is in a balanced state by the rotation shaft 22 and the slide shaft 21 positioned at the end portion 32*a*. The cover 10 is positioned at the second opened position by the balance between the cover rotation shaft 18 and the slide shaft 21 positioned at the end portion 32*a*. The second opened position is required to provide an open space through which the operator can replace units of the image forming apparatus 1 and parts of the cover 10, and a second angle which is an opening angle thereof is preferably set to an angle of 70 degrees or greater. In the present embodiment, the second angle is set to 75 degrees. The second angle is not limited to 70 degrees or greater, and it may be set within the range of 60 to 90 degrees, and may even be greater than 90 degrees.

Path Switching Mechanism

Next, a path switching mechanism 50 that switches the first path 31 and the second path 32 of the guide portion 30 will be described. According to the present embodiment, path switching mechanisms 50 are provided on both ends in the front and rear directions of the cover 10. However, since the configurations thereof are similar, only one of the path switching mechanisms 50 will be described. The path switching mechanism 50 may also be provided on only a front end portion of the cover 10.

FIGS. 5A to 8B are explanatory views showing a first path opened state of the path switching mechanism 50 according to the present embodiment. The second path 32 is formed to branch from a side surface of the first path 31. A path switching member 25 for switching paths between the first path 31 and the second path 32 is arranged at the branching point. The path switching member 25 is arranged rotatably about a rotation shaft 26 disposed on the cover 10, and it is engaged rotatably by an elastic engagement pawl 10*a* disposed on the cover 10. That is, the path switching mechanism 50 is an example of a rotating and switching portion, and the cover 10 may be switched between a first state in which the cover 10 is rotatable between the closed position and the first angle and a second state in which the cover 10 is rotatable at least between the first angle and the second angle.

The path switching mechanism 50 includes the guide portion 30, the support arm 20, and the path switching member 25. The guide portion 30 includes the first path 31 and the second path 32. The first path 31 enables the cover 10 to rotate between the closed position and the first angle by guiding the slide shaft 21 therein. The second path 32 enables the cover 10 to rotate from an angle exceeding the first angle to the second angle by guiding the slide shaft 21 therein.

The path switching member 25 is an example of a regulation portion capable of regulating movement of the slide shaft 21, and includes a first path blocking portion 25*a* that blocks the first path 31 and a second path blocking portion 25*b* that blocks the second path 32. In a state where the first path blocking portion 25*a* protrudes into the path of the guide portion 30, the first path 31 is blocked and the second path 32 is opened, such that the slide shaft 21 is enabled to move in the second path 32. Meanwhile, in a state where the second path blocking portion 25*b* protrudes into the path, the first path 31 is opened, such that the slide shaft 21 is enabled to move in the first path 31. That is, according to the path switching member 25, in a state where the slide shaft 21 is positioned on the first path 31, by having the second path blocking portion 25*b* protrude into the path and restrict entry to the second path 32, the path switching mechanism 50 is set to a first state (refer to FIGS. 5A to 6B). Moreover, according to the path switching member 25, in a state where the slide shaft 21 is positioned at the end portion 31*b* of the first path 31, by having the first path blocking portion 25*a* protrude into the path to communicate the first path 31 and the second path 32, the path switching mechanism 50 is set to a second state (refer to FIGS. 7A to 8B). In a state where the path switching mechanism 50 is in the second state, the first path blocking portion 25*a* serves as an example of a contact portion that intersects a trajectory of the slide shaft 21 in the first path 31 of the guide portion 30.

In order to enable the path switching member 25 to switch paths without fail, a mechanism to hold the position stably at each of a first path opening position where the first path 31 is opened and a second path opening position where the second path 32 is opened is required. According to the present embodiment, at first, in order to stabilize the position at the first path opening position, an engagement pawl 27 is provided on the path switching member 25, which is engaged with an engagement portion 28 of the cover 10 in a state where the path switching member 25 is positioned at the first path opening position. The engagement portion 28 is formed to protrude from an inner side of the cover 10. That is, the engagement portion 28 is an example of a retaining portion that retains the path switching member 25 such that the path switching mechanism 50 is maintained at the first state. Further, the path switching member 25 is released from retention by the engagement portion 28 through the operation of a holding portion 25*c*. A pawl member that deforms elastically is adopted as the engagement pawl 27 of the present embodiment considering costs, but the present technique is not limited thereto, and a configuration may be adopted in which a member that is different from the path switching member 25 and that is moved in sliding motion by an elastic spring member may be provided, as long as it has repeatability. Simultaneously, in order to stabilize the position at the second path opening position, the engagement pawl 27 is engaged with an engagement portion 29 of the cover 10 in a state where the path switching member 25 is positioned at the second path opening position (refer to FIG. 7B).

The holding portion 25*c* that is used by the operator when performing a path switching operation is provided on the path switching member 25. That is, the holding portion 25*c* is one example of an operating portion for switching the path switching mechanism 50 between the first state and the second state. The operator operates the holding portion 25*c* to open the second path 32 when switching the cover 10 from the first opened position to the second opened position, and guides the path switching member 25 to the second path opening position. The switching operation is completed by engaging the engagement pawl 27 to the engagement portion 28 of the cover 10. The holding portion 25*c* is exposed toward an inner side from an inner wall of the cover 10, and it is provided at a part other than the part being an external wall of the casing 1*a* at the cover 10 in the closed position. Therefore, it becomes possible to prevent the user from operating the holding portion 25*c* unintendedly when the cover 10 is closed.

Meanwhile, in a state where the first path 31 is opened, the operator rotates the cover 10 to the closed position without operating the holding portion 25*c*. Thereby, switching is completed by the slide shaft 21 coming into contact with the first path blocking portion 25*a*, guiding the path switching member 25 by pushing the same to the first path opening position, and engaging the engagement pawl 27 to the engagement portion 28 of the cover 10. By adopting the above-mentioned configuration, a switching mechanism for switching the paths of the slide shaft 21 can be realized.

Opening/Closing Operation of Cover

Figure 9A:
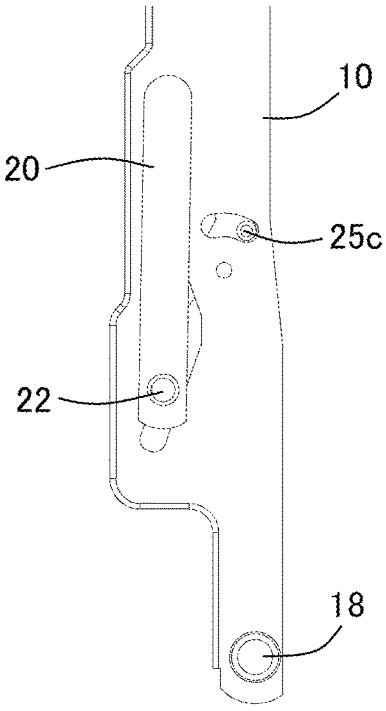
FIG. 9A is a view illustrating the cover and the guide portion viewed from one side of the guide portion in a state where the cover according to the first embodiment is positioned at the closed position.
Figure 9B:
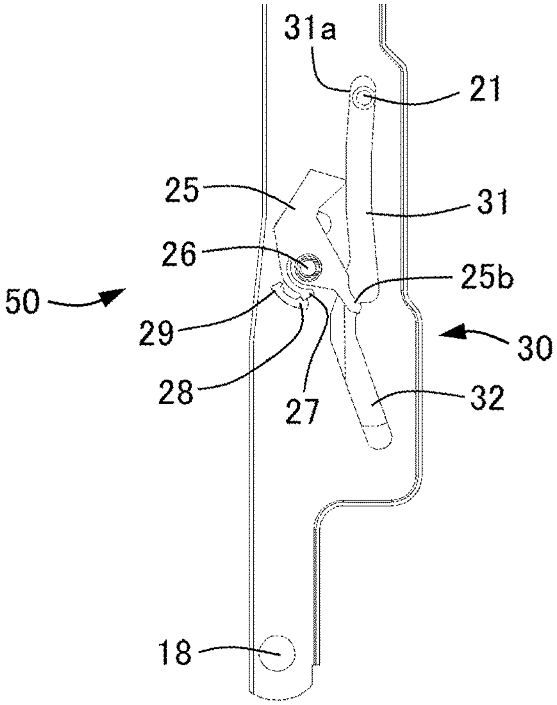
FIG. 9B is a view illustrating the cover and the guide portion viewed from the other side of the guide portion in a state where the cover according to the first embodiment is positioned at the closed position.
Figure 10A:
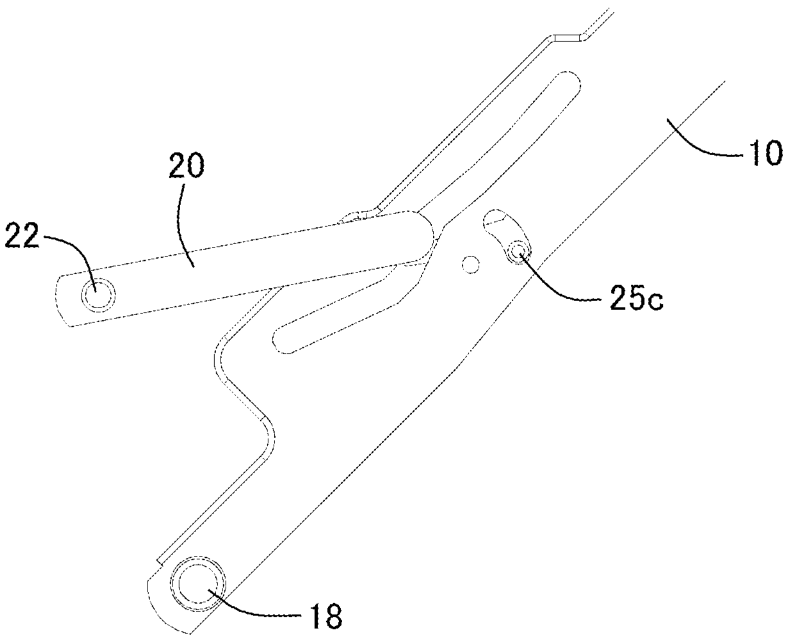
FIG. 10A is a view illustrating the cover and the guide portion viewed from one side of the guide portion in a state where the cover according to the first embodiment is positioned at the first opened position.
Figure 10B:
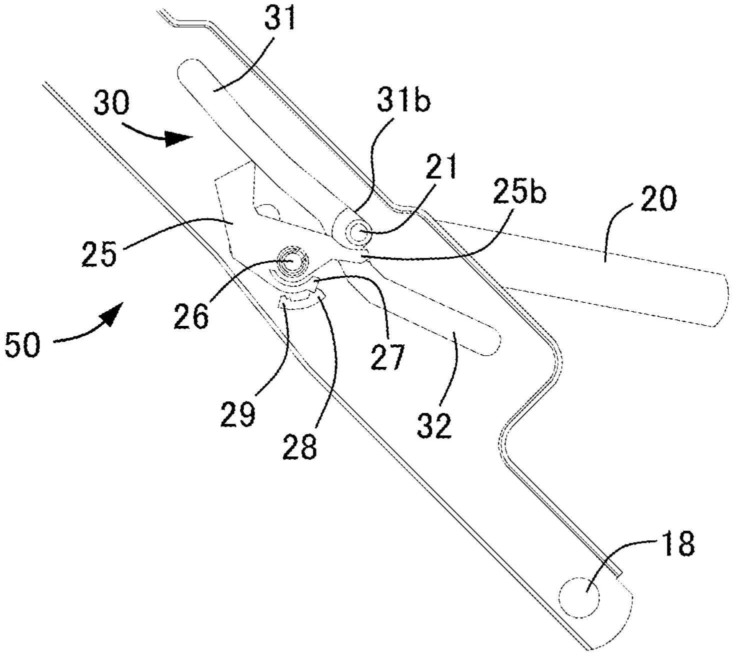
FIG. 10B is a view illustrating the cover and the guide portion viewed from the other side of the guide portion in a state where the cover according to the first embodiment is positioned at the first opened position.
Figure 11A:
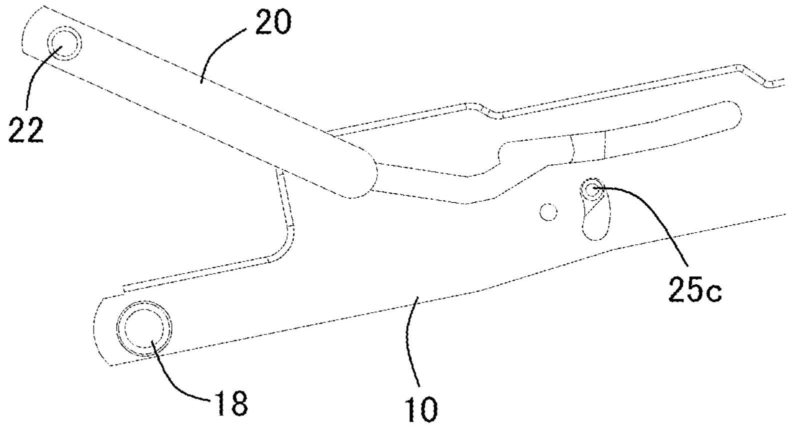
FIG. 11A is a view illustrating the cover and the guide portion viewed from one side of the guide portion in a state where the cover according to the first embodiment is positioned at the second opened position.
Figure 11B:
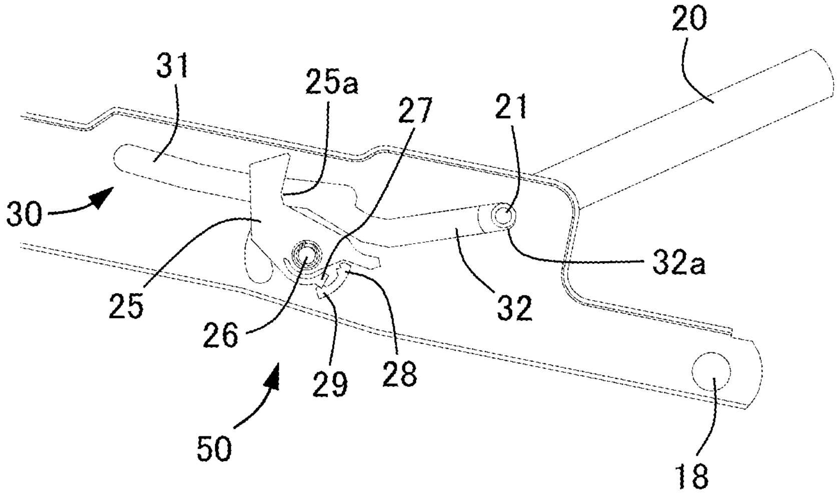
FIG. 11B is a view illustrating the cover and the guide portion viewed from the other side of the guide portion in a state where the cover according to the first embodiment is positioned at the second opened position.

An operation by which the operator switches the opening/closing angle of the cover 10 and a movement of the mechanism will be described. FIGS. 9A and 9B are an explanatory view of the opening/closing mechanism in the closed position state and the path switching mechanism 50 according to the present embodiment. FIGS. 10A and 10B are explanatory views of the opening/closing mechanism in the first opened position and the path switching mechanism 50. FIGS. 11A and 11B are explanatory views of the opening/closing mechanism in the second opened position and the path switching mechanism 50.

From Closed Position to First Opened Position

In order to open the cover 10 from the closed position, i.e., stored position, to the first opened position, i.e., jammed sheet removable position, if a lock mechanism is provided to lock the cover 10 to the image forming apparatus 1, the lock may be unlocked. When the opening operation is started, the slide shaft 21 of the support arm 20 slides along the first path 31 from an end portion 31*a* toward the end portion 31*b*. In this state, the path switching member 25 is at the first path opening position and the second path 32 is blocked, such that the slide shaft 21 is guided to the slide shaft 21 and reaches the end portion 31*b*, and the support arm 20 and the cover 10 are stopped in the balanced state. Thus, the opening operation to the first opened position, i.e., jammed sheet removable position, is completed.

From First Opened Position to Closed Position

When closing the cover 10 from the first opened position, i.e., jammed sheet removable position, to the closed position, i.e., stored position, the operator pushes the cover 10 toward the casing 1*a* of the image forming apparatus 1 using his/her hand. Thereby, the slide shaft 21 of the support arm 20 slides on the first path 31 from the end portion 31*b* toward the end portion 31*a*, and the lock mechanism is locked to the image forming apparatus 1, by which the movement is completed.

From First Opened Position to Second Opened Position

When opening the cover 10 from the first opened position, i.e., jammed sheet removable position, to the second opened position, i.e., unit replaceable position, at first, the path switching member 25 is moved to the second path opening position. The operator operates the holding portion 25*c* to move the same to the second path opening position, and the engagement pawl 27 is engaged from the engagement portion 28 to the engagement portion 29 of the cover 10. Thereby, the first path 31 is blocked, and instead, the second path 32 is opened. In this state, the cover 10 and the support arm 20 are still balanced and are still maintained at the first opened position. In this state, when the operator lifts the cover 10 slightly by which the slide shaft 21 is separated from the end portion 31*b*, the balanced state is cancelled and the slide shaft 21 is guided to the second path 32.

In this state, the cover 10 is not opened to the second opened position, i.e., unit replaceable position, immediately after switching the path switching member 25, and the balanced state is maintained. In other words, the path switching member 25 merely blocks the second path 32, and the load of the cover 10 is received by the end portion 31*b* provided on the first path 31. That is, the end portion 31*b* is an example of a receiving portion that receives the load of the cover 10 acting on the slide shaft 21 when the path switching mechanism 50 is in the first state and the cover 10 is positioned at the first opened position. Thereby, the only operating force for operating the path switching member 25 is the load that occurs when engaging the engagement pawl 27 from the engagement portion 29 to the engagement portion 28 of the cover 10. Thereby, the operating force exerted by the operator when performing operation can be reduced, and the life of the product can be extended. The slide shaft 21 guided to the second path 32 reaches the end portion 32*a*, and the support arm 20 and the cover 10 are stopped at the balanced state. Thereby, the opening operation to the second opened position, i.e., unit replaceable position, is completed.

From Second Opened Position to Closed Position

When closing the cover 10 from the second opened position, i.e., unit replaceable position, to the closed position, i.e., stored position, the operator pushes the cover 10 toward the casing 1*a* of the image forming apparatus 1 using his/her hand. Thereby, the slide shaft 21 of the support arm 20 slides on the second path 32 and the first path 31 from the end portion 32_a_ toward the end portion 31_a_, and the lock mechanism is locked to the image forming apparatus 1, by which the operation is completed. In this state, the first path 31 is blocked by the path switching member 25, but the slide shaft 21 is in contact with the first path blocking portion 25_a_ and pushes the path switching member 25 to guide the same toward the first path opening position. Then, switching is completed by engaging the engagement pawl 27 from the engagement portion 29 to the engagement portion 28 of the cover 10. That is, in a state where the slide shaft 21 is positioned at the second path 32, the cover 10 rotates toward the closed position, by which the slide shaft 21 abuts against and pushes the first path blocking portion 25_a_, such that the path switching mechanism 50 is switched from the second state to the first state.

Thereby, the operation from the closed position, i.e., stored position, to the first opened position, i.e., jammed sheet removable position, may be restarted. Thereby, when closing the cover 10 from the second opened position to the closed position, a configuration is adopted in which the path switching member 25 is returned to the first path opening position in a manner interlocked with the operation of the cover 10 without the operator operating the holding portion 25_c_. That is, the path switching mechanism 50 is switched from the first state to the second state by the operation of the holding portion 25_c_, while the path switching mechanism 50 is switched from the second state to the first state by rotating the cover 10 from the second angle to the closed position. Thereby, the possibility of the operator performing an erroneous operation, such as failure to operate the mechanism, may be reduced.

As described, according to the image forming apparatus 1 of the present embodiment, the path switching mechanism 50 includes the holding portion 25_c_ that switches between the first state and the second state. Therefore, the cover 10 may be opened greatly from the first angle to the second angle by the operation of the holding portion 25_c_, such that the operability for opening the cover 10 in two stages can be simplified. That is, since the path switching operation of opening the cover 10 from the first stage to the second stage can only be realized by switching the holding portion 25_c_, a simultaneous operation of receiving the load of the cover 10 while operating the support arm to switch paths becomes unnecessary. Thereby, the operation for opening the cover to the second stage is simplified, such that the switching operation may be performed by anyone, instead of being limited to a dedicated operator.

According to the embodiment mentioned above, a case has been described in which the cover 10 is a cover disposed on a right side of the casing 1_a_, but the present technique is not limited thereto. For example, the cover may be disposed on the left side of the casing 1_a_, or the cover may be a front cover. According further to the present embodiment, a case has been described in which the cover rotation shaft 18 supporting the cover 10 is arranged in a horizontal direction, but the present technique is not limited thereto, and for example, the cover rotation shaft may be arranged in the vertical direction.

According to the embodiment described above, a case has been described in which the cover 10 is opened in two stages, but the present technique is not limited thereto, and a configuration can be adopted in which the cover 10 is opened in three or more stages. In that case, paths for the guide portion per stage and path switching members are provided.

According to the embodiment described above, a case has been described in which the cover 10 is a cover of the image forming apparatus 1 equipped with an image forming unit, but the present technique is not limited thereto, and the image forming apparatus may include a postprocessing apparatus such as a finisher, and the cover may be a casing of the postprocessing apparatus.

Second Embodiment

Next, a second embodiment of the present invention will be described in detail with reference to FIGS. 12A to 19. The present embodiment differs from the first embodiment in that path switching mechanisms 150 disposed at each end portion in the front-rear direction of the cover 10 are interlocked. Other configurations are similar to the first embodiment, such that the same reference numbers are assigned to corresponding components, and detailed descriptions thereof are omitted.

According to the present embodiment, as illustrated in FIGS. 12A to 13C, path switching mechanisms 150A and 150B are respectively arranged on end potions in the front-rear direction of the cover 10. The path switching mechanism 150A is one example of a first rotating and switching portion, and it is arranged on one side, i.e., rear side, in a rotational axis direction of the cover 10. The path switching mechanism 150A is switched between a first state in which the cover 10 is rotatable between a closed position and a first angle and a second state in which the cover 10 is rotatable between at least the first angle and a second angle. The path switching mechanism 150B is one example of a second rotating and switching portion, which is arranged on the other side, i.e., front side, in the rotational axis direction of the cover 10. The path switching mechanism 150B is switched between a third state in which the cover 10 is rotatable between the closed position and the first angle and a fourth state in which the cover 10 is rotatable between at least the first angle and the second angle. A configuration of an interlocking portion 33 that interlocks the path switching mechanisms 150A and 150B will be described later. The path switching mechanisms 150A and 150B adopt a symmetrical shape, and configurations thereof are similar, such that only one of the path switching mechanisms 150 will be described below with reference to FIGS. 14A to 19B.

General Configuration of Opening/Closing Mechanism of Cover

Figure 14A:
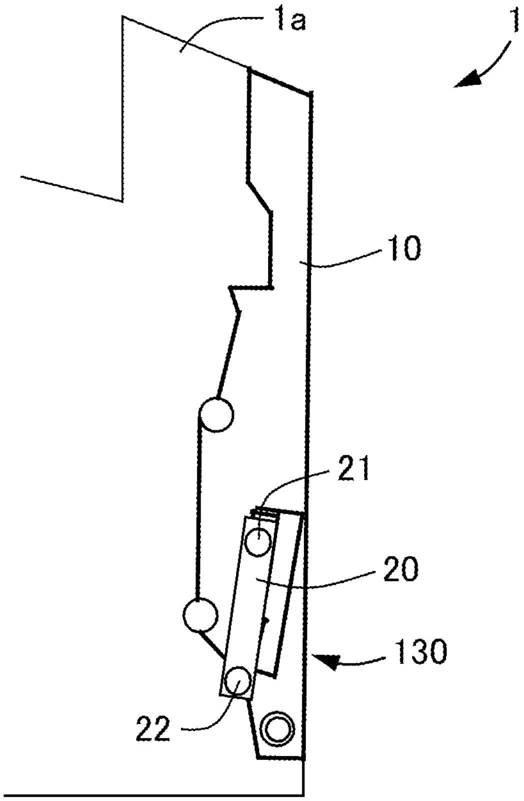
FIG. 14A is a front view of the cover in a state where the cover according to the second embodiment is positioned at the closed position.
Figure 14B:
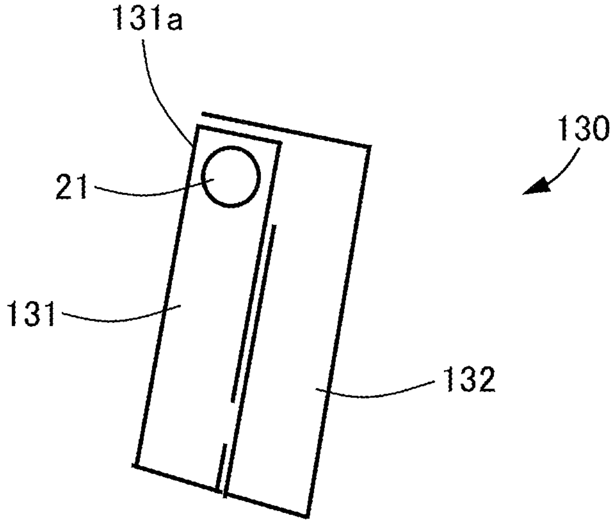
FIG. 14B is a front view of the guide portion in a state where the cover according to the second embodiment is positioned at the closed position.
Figure 15A:
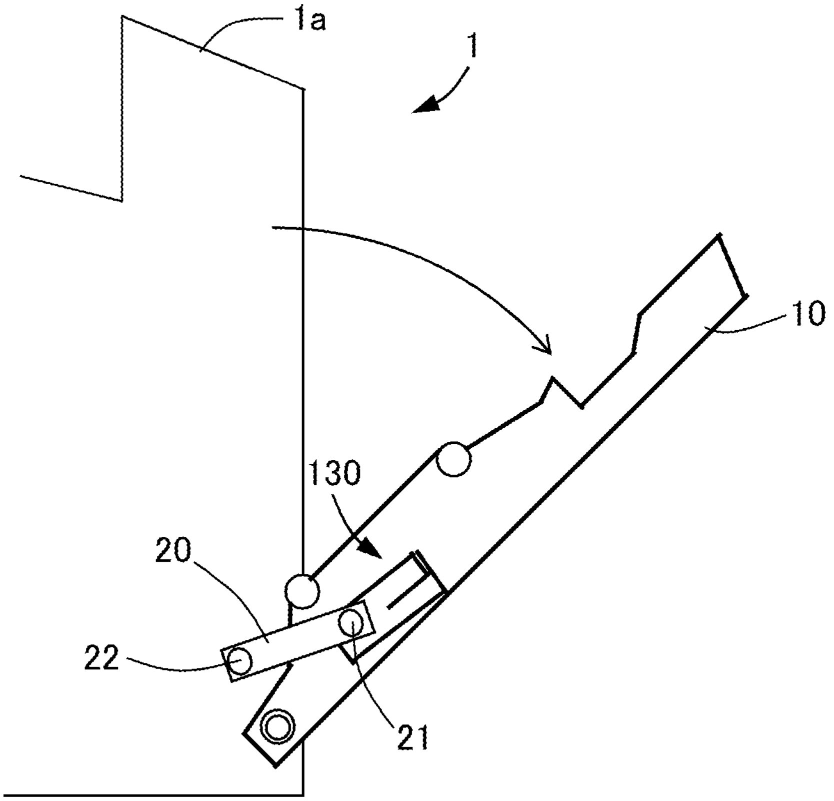
FIG. 15A is a front view of the cover in a state where the cover according to the second embodiment is positioned at the first opened position.
Figure 15B:
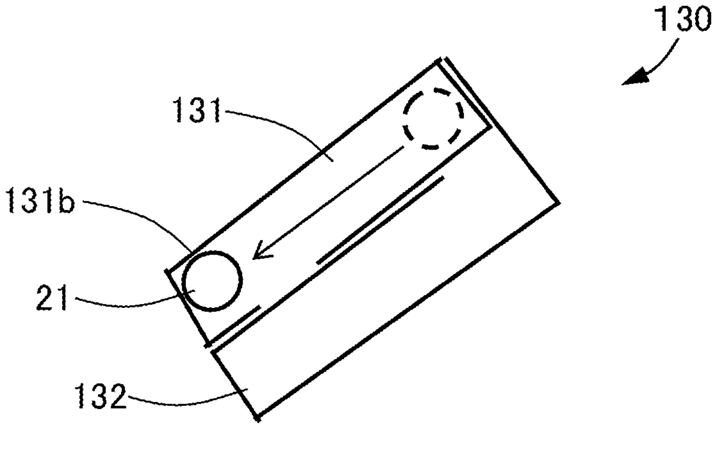
FIG. 15B is a front view of the guide portion in a state where the cover according to the second embodiment is positioned at the first opened position.
Figure 16A:
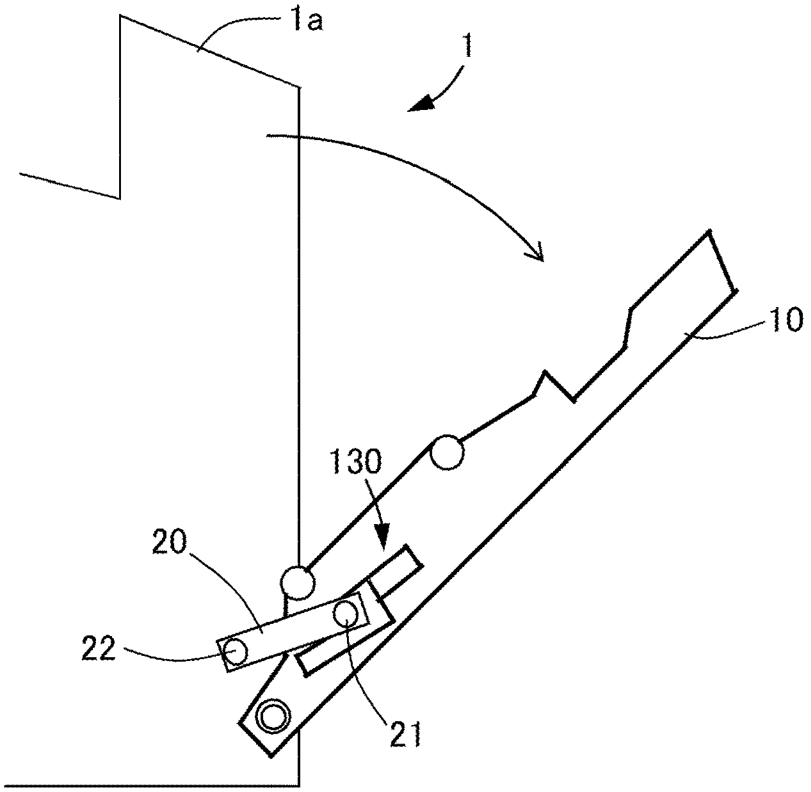
FIG. 16A is a front view of the cover illustrating the guide portion in a state where the cover according to the second embodiment is positioned at the first opened position and the holding portion has been operated.
Figure 16B:
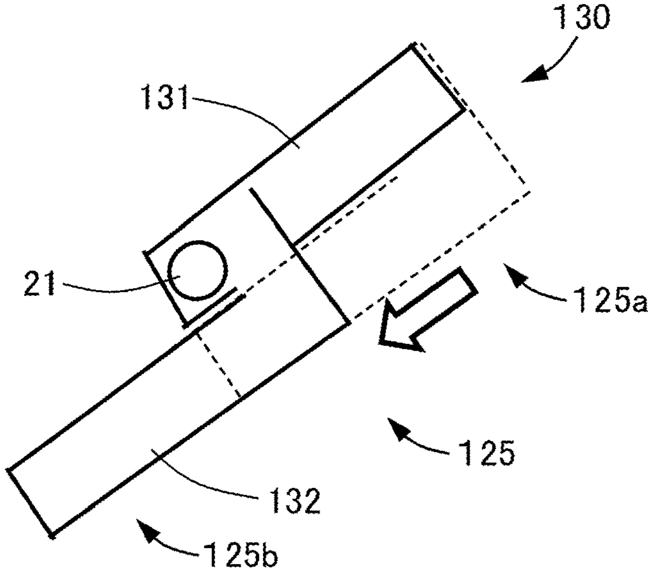
FIG. 16B is a front view of the guide portion illustrating the guide portion in a state where the cover according to the second embodiment is positioned at the first opened position and the holding portion has been operated.
Figure 17A:
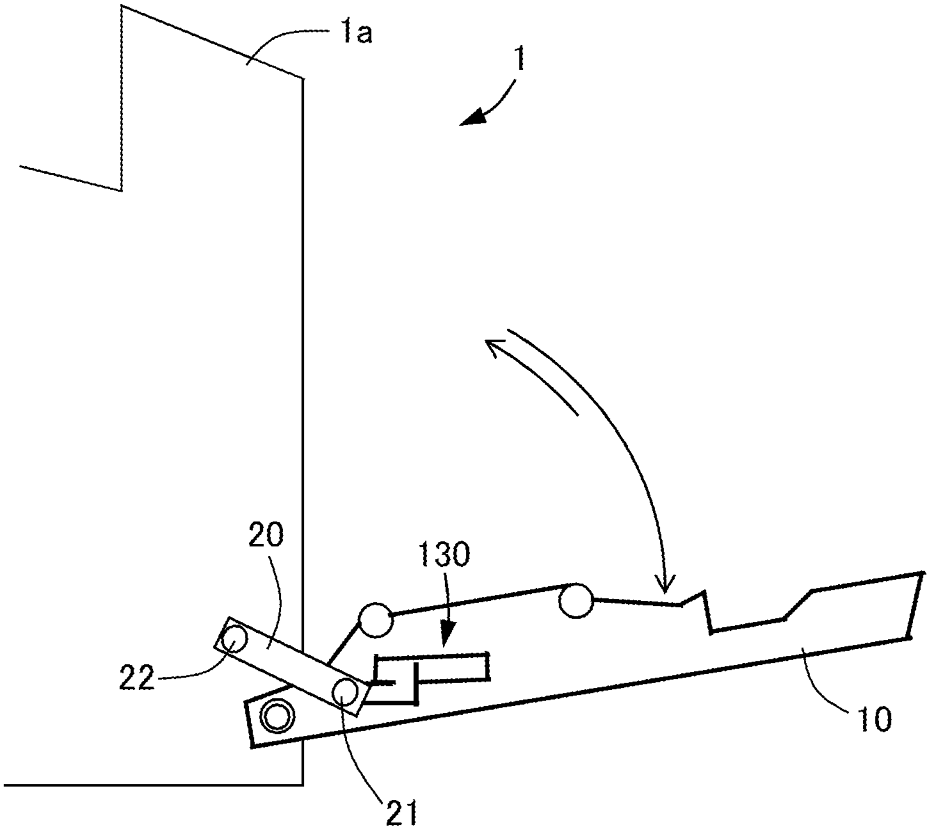
FIG. 17A is a front view of the cover in a state where the cover according to the second embodiment is positioned at the second opened position.
Figure 17B:
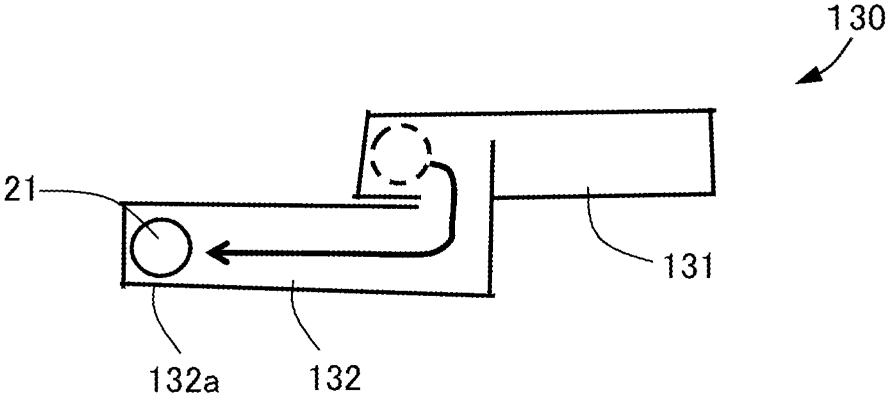
FIG. 17B is a front view of the guide portion in a state where the cover according to the second embodiment is positioned at the second opened position.

FIG. 14A is an explanatory view of a closed position state, i.e., sheet conveyable state or standby state, of an opening/closing mechanism according to the present embodiment, FIG. 15A is an explanatory view of a first opened position, i.e., jammed sheet removable position, of the opening/closing mechanism, and FIG. 17A is an explanatory view of a second opened position, i.e., unit replaceable position, of the opening/closing mechanism. FIGS. 14B, 15B, and 17B respective illustrate the position of a slide shaft 21 in a guide portion 30 corresponding to FIGS. 14A, 15A, and 17A.

Closed Position, i.e., Sheet Conveyable State or Standby State

As illustrated in FIGS. 14A and 14B, in a state where the slide shaft 21 of a support arm 20 is positioned at an end portion 131_a_ of a first path 131, the support arm 20 is approximately parallel to approximately a vertical direction of the cover 10, and the cover 10 is at a closed position stored in the image forming apparatus 1.

First Opened Position, i.e., Jammed Sheet Removable Position

As illustrated in FIGS. 15A and 15B, when the slide shaft 21 of the support arm 20 is positioned at an end portion 131_b_ opposite to the closed position of the first path 131, the support arm 20 is in a balanced state by the rotation shaft 22 and the slide shaft 21 positioned at the end portion 131*b*. The cover 10 is positioned at the first opened position by the cover rotation shaft 18 and the slide shaft 21 positioned at the end portion 131*b* being balanced.

Second Opened Position, i.e., Unit Replaceable Position

As illustrated in FIGS. 17A and 17B, when the slide shaft 21 of the support arm 20 is positioned at an end portion 132*a* of a second path 132, the support arm 20 is in a balanced state by the rotation shaft 22 and the slide shaft 21 positioned at the end portion 132*a*. The cover 10 is positioned at the second opened position by the cover rotation shaft 18 and the slide shaft 21 positioned at the end portion 132*a* being balanced.

Operation of Path Switching Mechanism

An operation of a guide portion 130 when the cover 10 is moved from the first opened position to the second opened position will be described. In order to move the cover 10 from the first opened position to the second opened position, it is necessary to move the slide shaft 21 from the first path 131 to the second path 132. From the closed position illustrated in FIGS. 14A and 14B, the operation of moving the slide shaft 21 from the first path 131 to the second path 132 and moving the cover 10 from the first opened position to the second opened position will be described. In a state where the slide shaft 21 is positioned at the end portion 131*b*, the operator moves a path switching member 125 from a position 125*a* to a position 125*b* illustrated in FIG. 16, and the second path 132 is opened. Thereafter, as illustrated in FIG. 17A, by closing the cover 10 slightly, the slide shaft 21 falls into the second path 132, and in that state, by opening the cover 10 again, the cover 10 may be opened to the second opened position.

Operation of Path Switching Member During Opening Operation of Cover

Figure 12A:
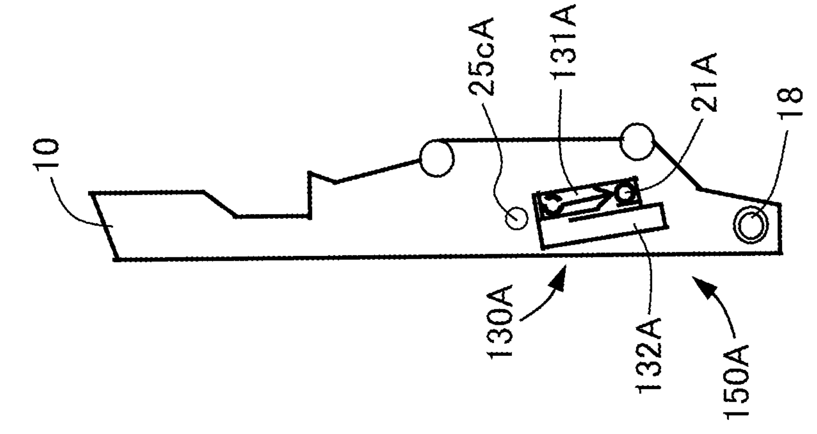
FIG. 12A is a rear view of a cover and a guide portion in a state where a cover according to a second embodiment is positioned at a first opened position.
Figure 12B:
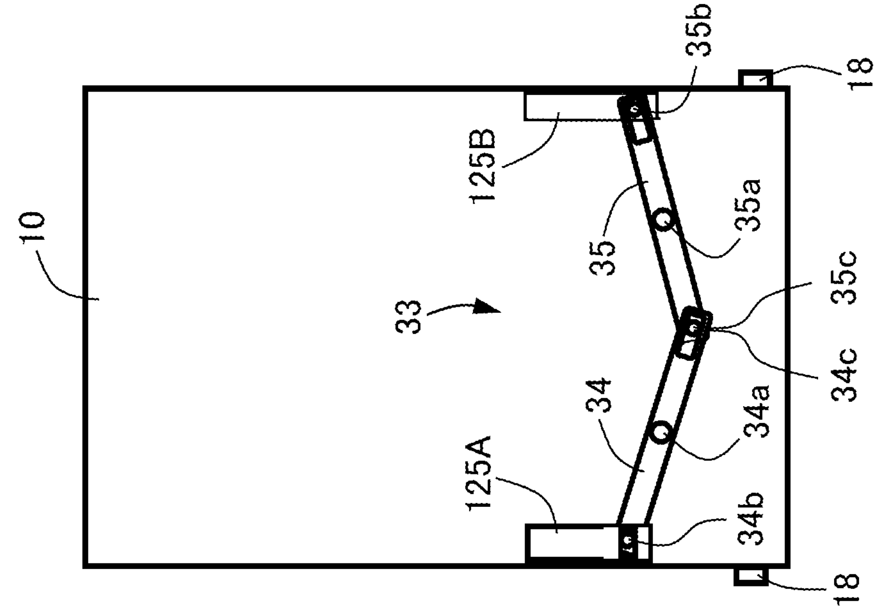
FIG. 12B is a left side view of the cover and the guide portion in a state where the cover according to the second embodiment is positioned at the first opened position.
Figure 12C:
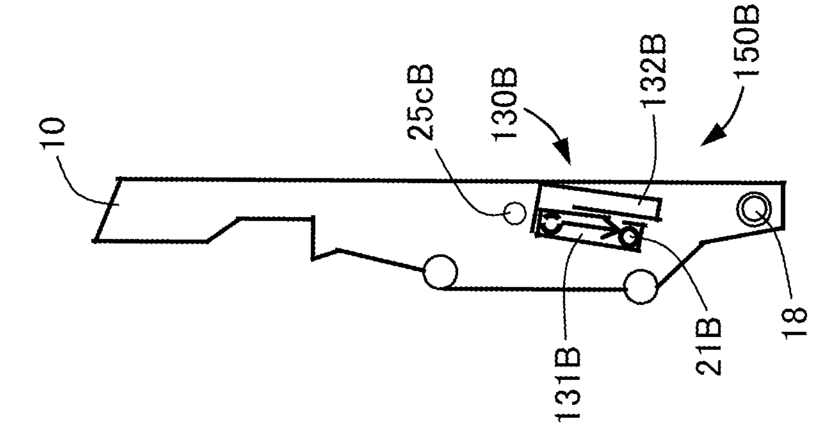
FIG. 12C is a front view of the cover and the guide portion in a state where the cover according to the second embodiment is positioned at the first opened position.

FIGS. 12A to 12C are three-side views illustrating the interlock of the path switching mechanisms 150A and 150B provided on both ends in a rotation center shaft direction of the cover 10. In image forming apparatuses 1, the size of the cover 10 tends to increase along with the increase in corresponding sheet sizes, the enhancement of speed and the increase of functions leading to improved productivity. In the present embodiment, in order to regulate the opening angle of the cover 10 that may be large and heavy, the support arm 20 is provided on both end portions in the rotational axis direction of the cover 10. Along therewith, guide portions 130A and 130B and path switching members 125A and 125B are provided respectively to correspond to the two support arms 20. If slide shafts 21A and 21B of the two support arms 20 are positioned at different paths, deformation and damage may occur due to the twisting or distortion of the cover, or damage of the support arm 20 may be caused by the concentration of load on only one of the support arms 20. In some cases, the cover itself may fall from the casing 1*a* and the cover may be damaged. In order to prevent these drawbacks, it is desirable that the two path switching members 125A and 125B are interlocked when switching positions.

The interlocking of operations of the path switching members 125A and 125B using the interlocking portion 33 will be described with reference to FIGS. 12A to 12C. The interlocking portion 33 interlocks the operation in which the path switching member 125A switches from the first state to the second state and the operation in which the path switching member 125B switches from the third state to the fourth state. The present embodiment adopts a configuration in which, by mechanically connecting the path switching members 125A and 125B by the interlocking portion 33, when the path switching member 125A performs positional movement, the path switching member 125B is interlocked infallibly and the position thereof is moved. Further, similar to the holding portion 25*c* of the first embodiment, a first holding portion 25*c*A that is arranged on one side, i.e., rear side, in the rotational axis direction of the cover 10 and that switches the path switching member 125A between the first state and the second state is provided as a first operating portion. Similarly, a second holding portion 25*c*B that is arranged on the other side, i.e., front side, in the rotational axis direction of the cover 10 and that switches the path switching member 125B between the third state and the fourth state is provided as a second operating portion. In this case, by operating the first holding portion 25*c*A or the second holding portion 25*c*B, the path switching member 125A may be switched between the first state and the second state, and the path switching member 125B may be switched between the third state and the fourth state.

The interlocking portion 33 includes a first link 34 and a second link 35 that are mutually connected rotatably. The first link 34 includes a first connecting portion 34*b* that is interlocked to the path switching member 125A, a second connecting portion 34*c* that is connected rotatably to the second link 35, and a first supporting portion 34*a* that is supported rotatably to the cover 10 between the first connecting portion 34*b* and the second connecting portion 34*c*. The second link 35 includes a third connecting portion 35*b* that is interlocked to the path switching member 125B, a fourth connecting portion 35*c* that is connected rotatably to the first link 34, and a second supporting portion 35*a* that is supported rotatably to the cover 10 between the third connecting portion 35*b* and the fourth connecting portion 35*c*. The second connecting portion 34*c* of the first link 34 and the fourth connecting portion 35*c* of the second link 35 are mutually rotatably connected.

In a guide portion 130A, an end portion 131*b*A is an example of a first receiving portion, and in a state where the path switching member 125A is in the first state and the cover 10 is positioned at the first opened position, the load of the cover 10 acting on a slide shaft 21A serving as a first guided portion is received. In a guide portion 130B, an end portion 131*b*B is an example of a second receiving portion, and in a state where the path switching member 125B is in the third state and the cover 10 is positioned at the first opened position, the load of the cover 10 acting on a slide shaft 21B serving as a second guided portion is received.

Figure 13A:
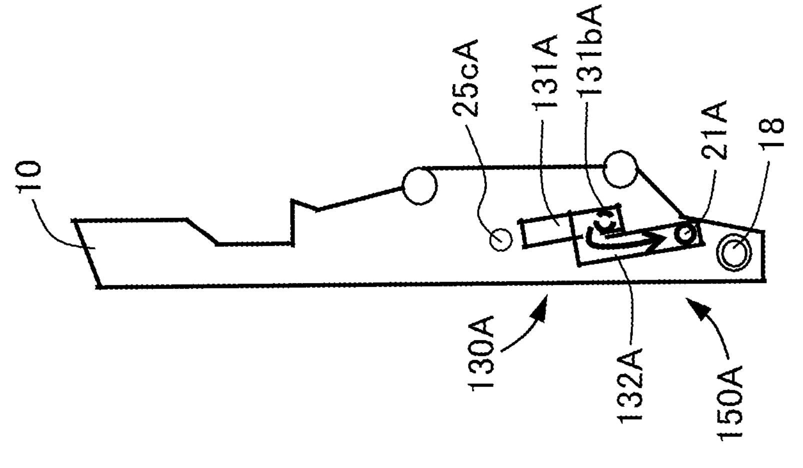
FIG. 13A is a rear view of the cover and the guide portion in a state where the cover according to the second embodiment is positioned at the second opened position.
Figure 13B:
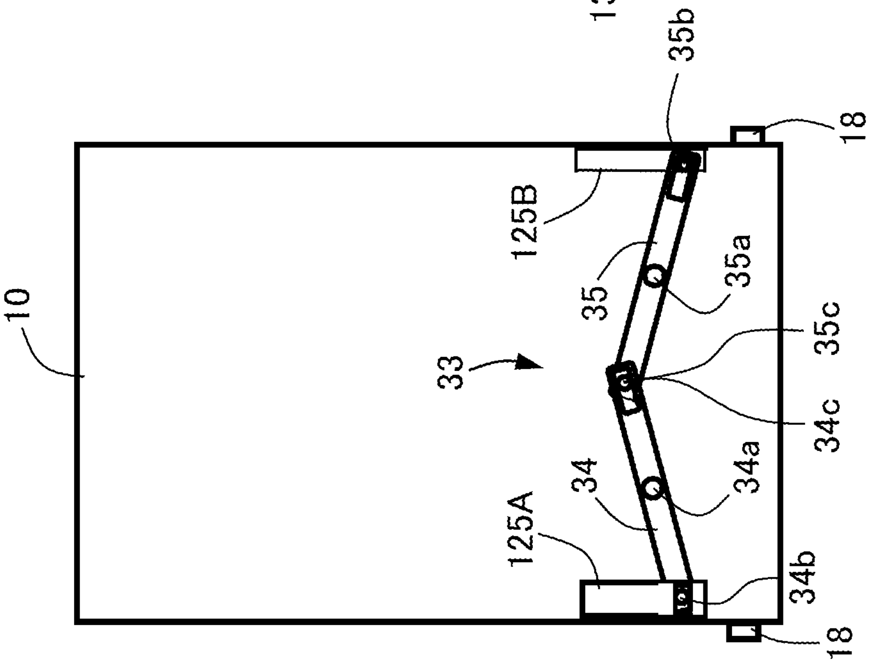
FIG. 13B is a left side view of the cover and the guide portion in a state where the cover according to the second embodiment is positioned at the second opened position.
Figure 13C:
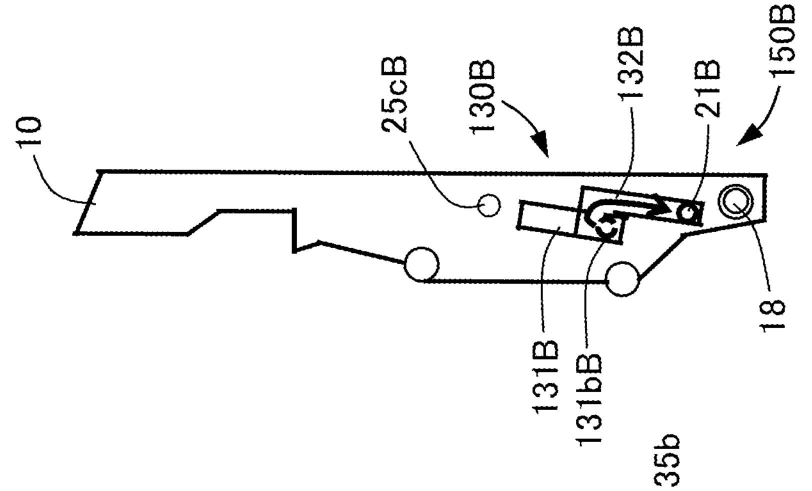
FIG. 13C is a front view of the cover and the guide portion in a state where the cover according to the second embodiment is positioned at the second opened position.

As illustrated in FIGS. 12A to 12C, when the path switching member 125A is positioned at the position 125*a* (refer to FIG. 16), the path switching member 125B is also positioned at the position 125*a* through the interlocking portion 33. As illustrated in FIGS. 13A to 13C, when the path switching member 125A is positioned at the position 125*b* (refer to FIG. 16), the path switching member 125B is also positioned at the position 125*b* through the interlocking portion 33. As described, the position of the path switching member 125B can be switched infallibly by being interlocked with the switching of position of the path switching member 125A.

Figure 18A:
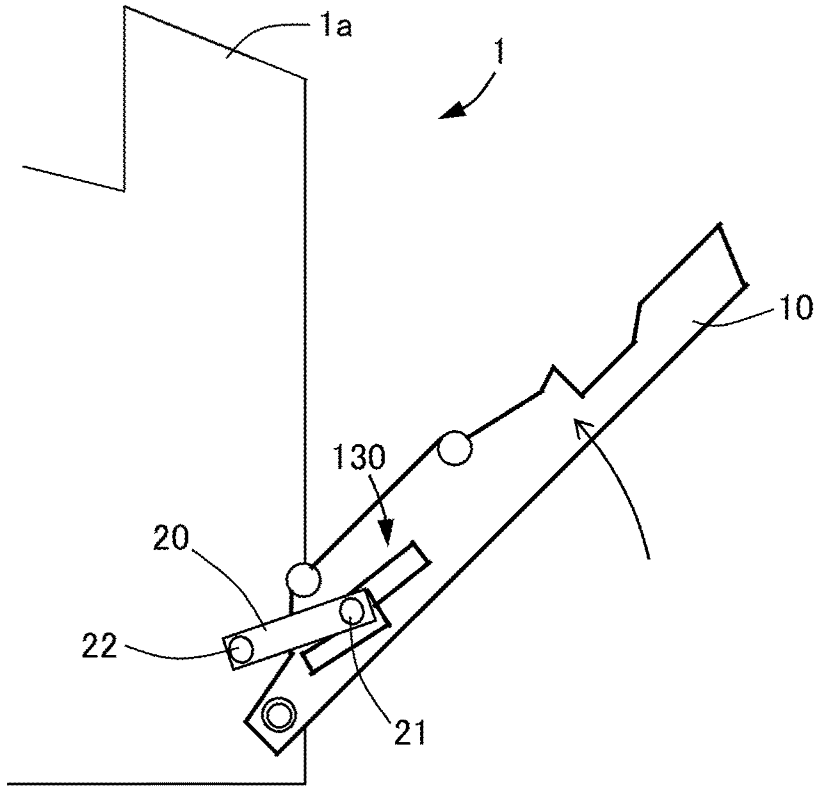
FIG. 18A is a front view of the cover illustrating an operation where the cover according to the second embodiment is returned from the second opened position to the first opened position.
Figure 18B:
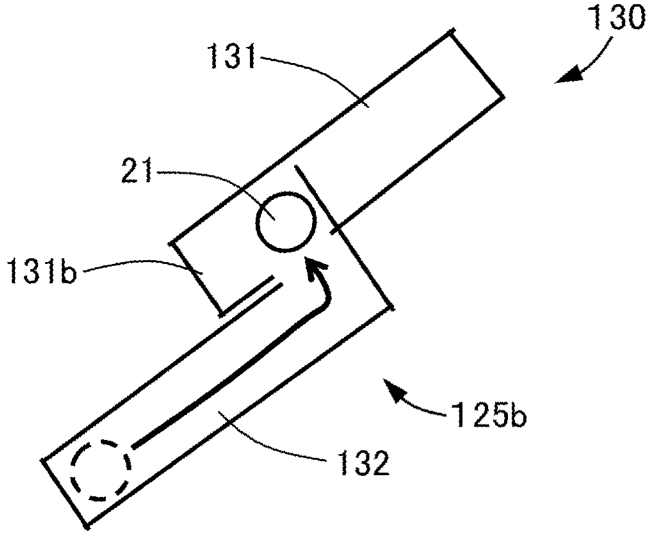
FIG. 18B is a front view of the guide portion illustrating an operation where the cover according to the second embodiment is returned from the second opened position to the first opened position.
Figure 19A:
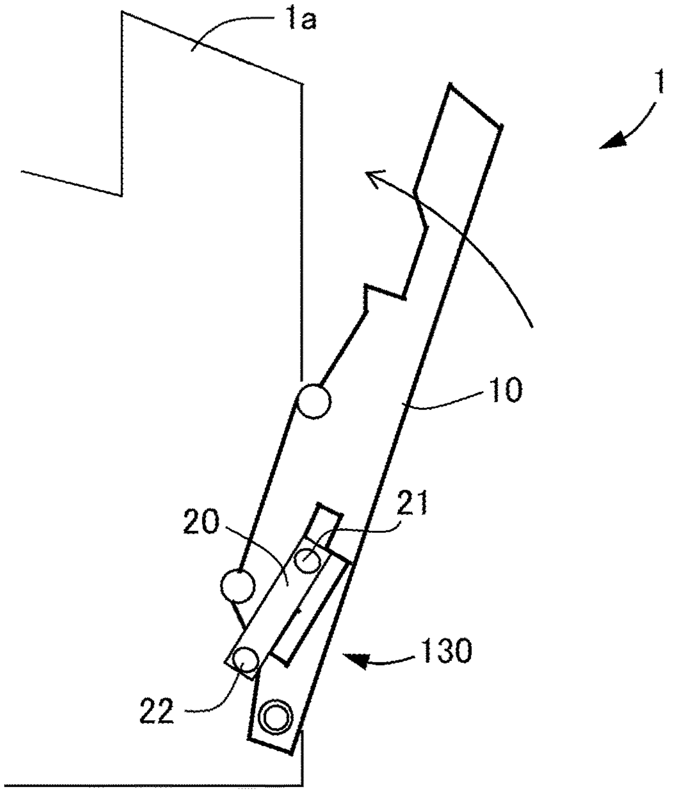
FIG. 19A is a front view of the cover illustrating an operation where the cover according to the second embodiment is returned from the first opened position to the closed position.
Figure 19B:
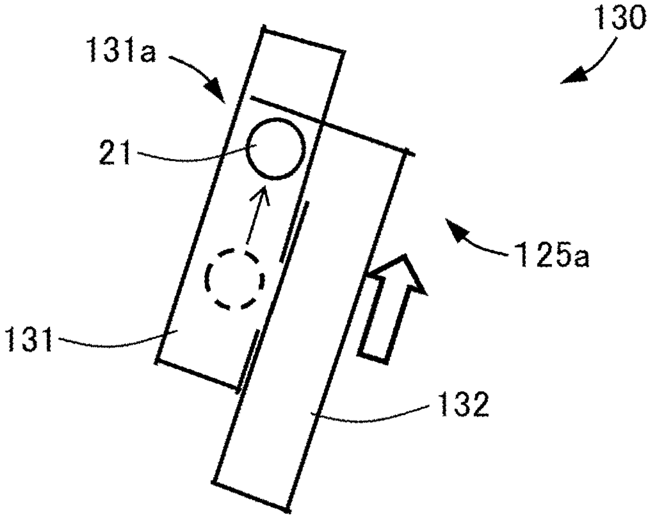
FIG. 19B is a front view of the guide portion illustrating an operation where the cover according to the second embodiment is returned from the first opened position to the closed position.

Operation of Path Switching Member for Cover Closing Operation, i.e., from Second Opened Position to First Opened Position or Closed Position The closing operation of the cover 10 from the second opened position to the first opened position and to the closed position state will be described with reference to FIGS. 18 and 19. FIG. 18B illustrates a state in which the cover 10 is closed from the second opened position and the slide shaft 21 has returned from the second path 132 to the end portion 131*b* of the first path 131. Further, FIG. 19 illustrates a state in which the closing operation is further advanced. According to the angle of the cover 10, the path switching member 25 may be moved from the position 125*b* to the position 125*a* while the slide shaft 21 moves within the first path 131 toward the end portion 131*a* of the first path 131. Therefore, when an operation to close the cover 10 from the second opened position to the closed position is performed, the operator may return the path switching member 25 to the position 125*a* simply by closing the cover 10.

As described, in the image forming apparatus 1 of the present embodiment, according to the opening/closing angle switching operation of the cover 10, the position of the path switching member 125B may be moved in an interlocked manner with the movement of position of the path switching member 125A, such that the operation can be simplified. Therefore, not only dedicated operators but also general users can perform the switching operation, and replacement of periodically replaced units can be performed by the users.

The present embodiment illustrates a case in which the interlocking portion 33 is formed of a link mechanism having two links, but the present technique is not limited thereto. A configuration using a gear can be adopted, for example, as long as the configuration causes the path switching members 125A and 125B to be interlocked. Further, the interlocking portion 33 as described in the present embodiment may be applied to the first embodiment. In that case, for example, the operations of the path switching members 25 disposed on both end portions of the cover 10 may be interlocked.

Third Embodiment

Next, a third embodiment of the present invention will be described in detail with reference to FIGS. 20 to 28. The configuration of the present embodiment differs from the first embodiment in that a switch 225 serving as an operating portion may be locked to prevent erroneous operation. Other configurations are similar to the first embodiment, such that the same reference numbers are assigned to corresponding components, and detailed descriptions thereof are omitted.

Figure 20:
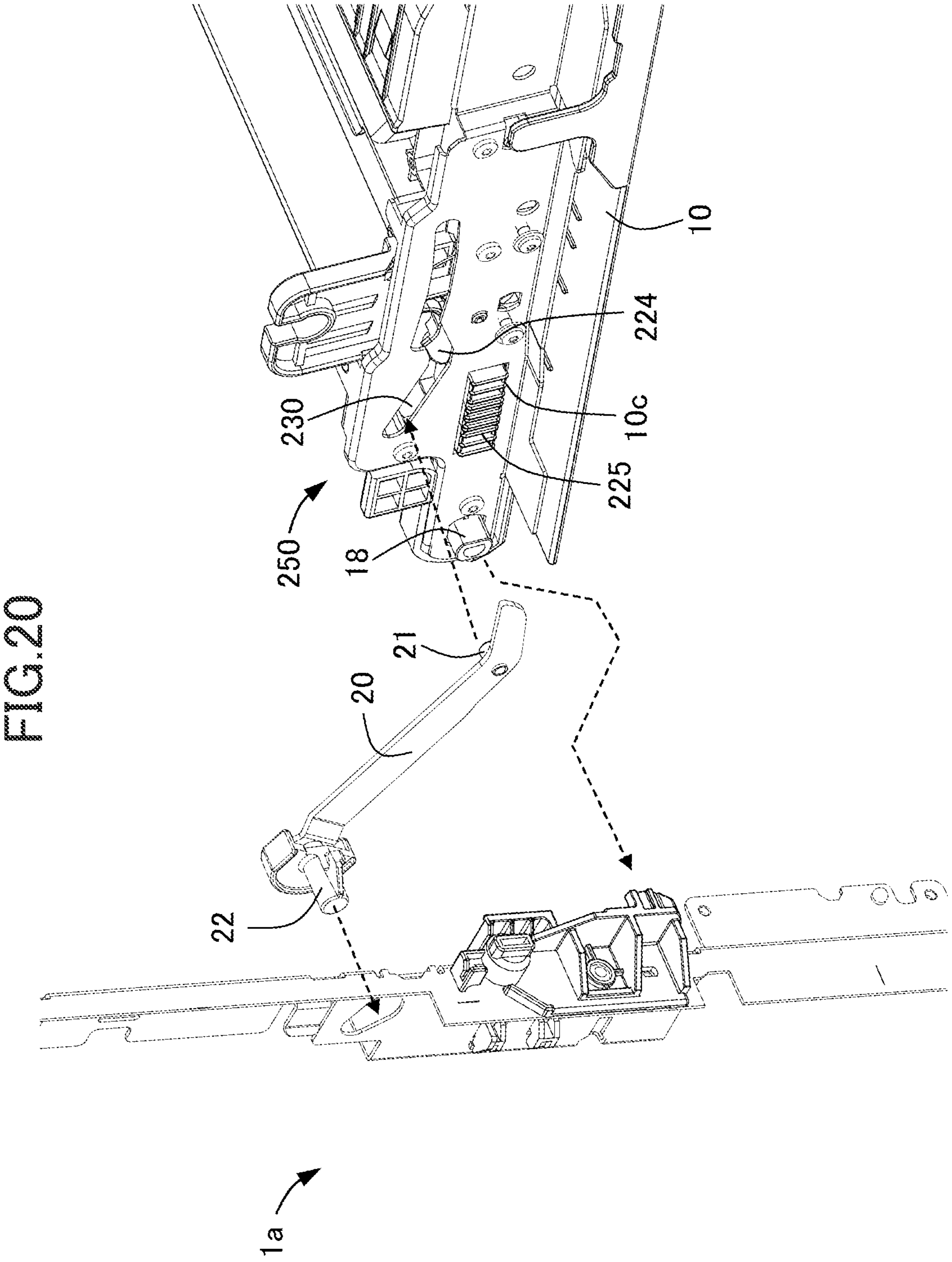
FIG. 20 is an exploded perspective view of a configuration related to an opening and closing of a cover according to a third embodiment.

In the present embodiment, path switching mechanisms 250 are arranged at front and rear end portions of the cover 10, as illustrated in FIG. 20. The path switching mechanism 250 is an example of a rotating and switching portion, which switches between a first state in which the cover 10 is rotatable between a closed position and a first angle and a second state in which the cover 10 is rotatable between at least the first angle and a second angle. In the present embodiment, the path switching mechanisms 250 are each arranged on the front and rear end portions of the cover 10. Since they adopt similar configurations, only one of the path switching mechanisms 250 will be described. Further, the path switching mechanism 250 may be provided on only a front-side end portion of the cover 10, for example.

Configuration Regarding Opening and Closing of Cover

FIG. 20 illustrates a configuration regarding the opening and closing of the cover 10. The cover 10 includes the cover rotation shaft 18. The path switching mechanism 250 includes a guide portion 230 having an opened shape, the support arm 20 which is an example of a support member, and a lock portion 224 which is an example of a regulation portion. The support arm 20 includes the slide shaft 21 and the rotation shaft 22. The guide portion 230 and the slide shaft 21 are designed to be engaged, and the cover rotation shaft 18, the rotation shaft 22, and the image forming apparatus 1 are designed to be engaged.

Figure 21:
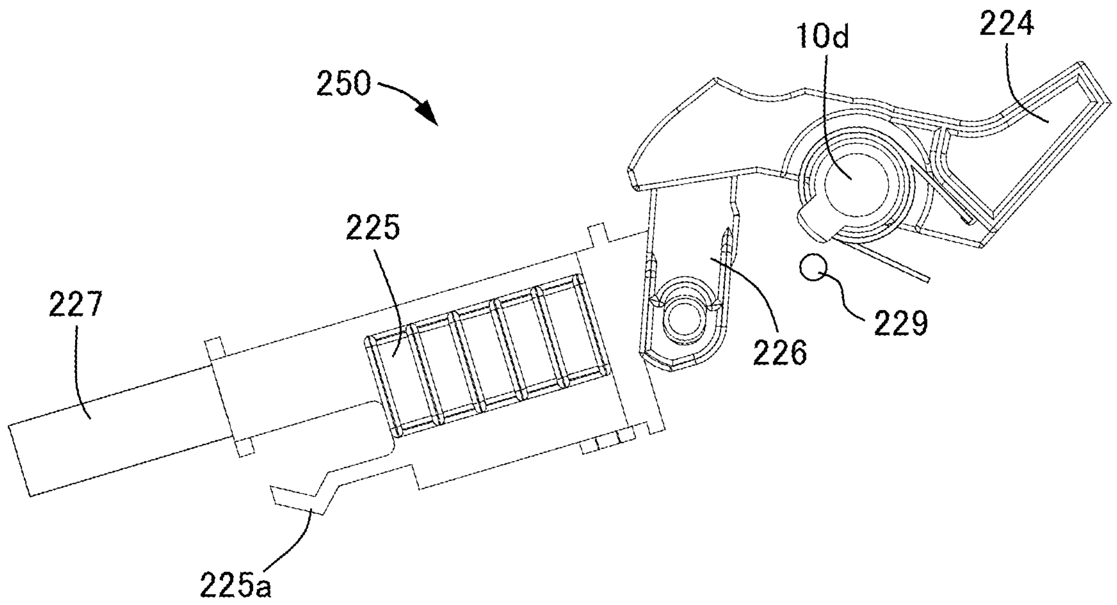
FIG. 21 is an explanatory view of a link configuration of a switch according to the third embodiment.

The switch 225 is slidably attached to a switch guide 10*c*, which are connected through the lock portion 224 and a link 226 as illustrated in FIG. 21, wherein the link 226 is engaged rotatably with each of the switch 225 and the lock portion 224. The lock portion 224 is rotatably engaged to the cover 10 through a lock portion rotation shaft 10*d* (refer to FIG. 24). The cover 10 rotates about the cover rotation shaft 18, and the orientation of the cover 10 is determined by the slide shaft 21 and the guide portion 230. Although described in detail below, the switch 225 is an example of an operating portion, and a position thereof is changed between a first operating position (refer to FIG. 22) in which the path switching mechanism 250 is set to a first state and a second operating position (refer to FIG. 25) in which the path switching mechanism 250 is set to a second state.

Transition from Closed Position to First Position

Figure 22:
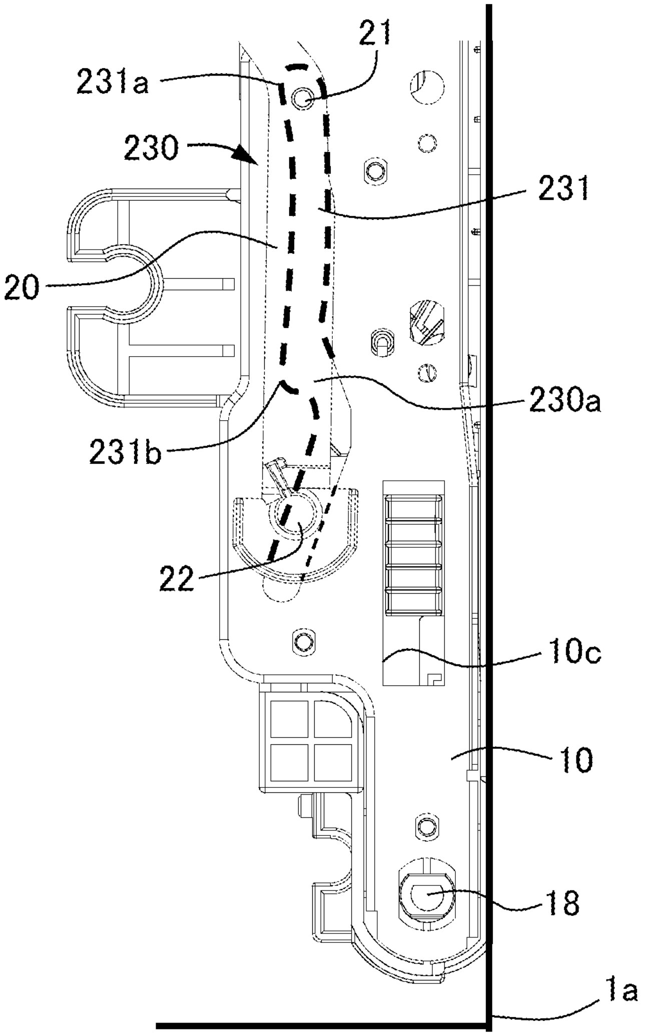
FIG. 22 is a front view of a state where the cover according to the third embodiment is positioned at a closed position.

FIG. 22 illustrates a detail of a closed position of the cover 10. When the slide shaft 21 of the support arm 20 is positioned at an end portion 231*a* of a first path 231, the support arm 20 is approximately parallel to the cover 10, and the cover 10 will be in a closed position stored in the image forming apparatus 1. In this state, by providing a lock mechanism by which the cover 10 is locked to the image forming apparatus 1 at an arbitrary position, the slide shaft 21 will not receive any load from the cover 10. When the cover 10 in the closed position state is opened, the slide shaft 21 is guided along the first path 231 of the guide portion 230 and moves from the end portion 231*a* to an end portion 231*b*, by which the cover 10 is transited to the first opened position illustrated in FIG. 23. When the slide shaft 21 of the support arm 20 is positioned at the end portion 231*b* of the first path 231, the support arm 20 is in a balanced state by the rotation shaft 22 and the slide shaft 21 positioned at the end portion 231*b*. The cover 10 is in a first opened position state by the cover rotation shaft 18 and the slide shaft 21 positioned at the end portion 231*b* serving as a receiving portion being balanced.

Transition from First Opened Position to Second Opened Position

Figure 23:
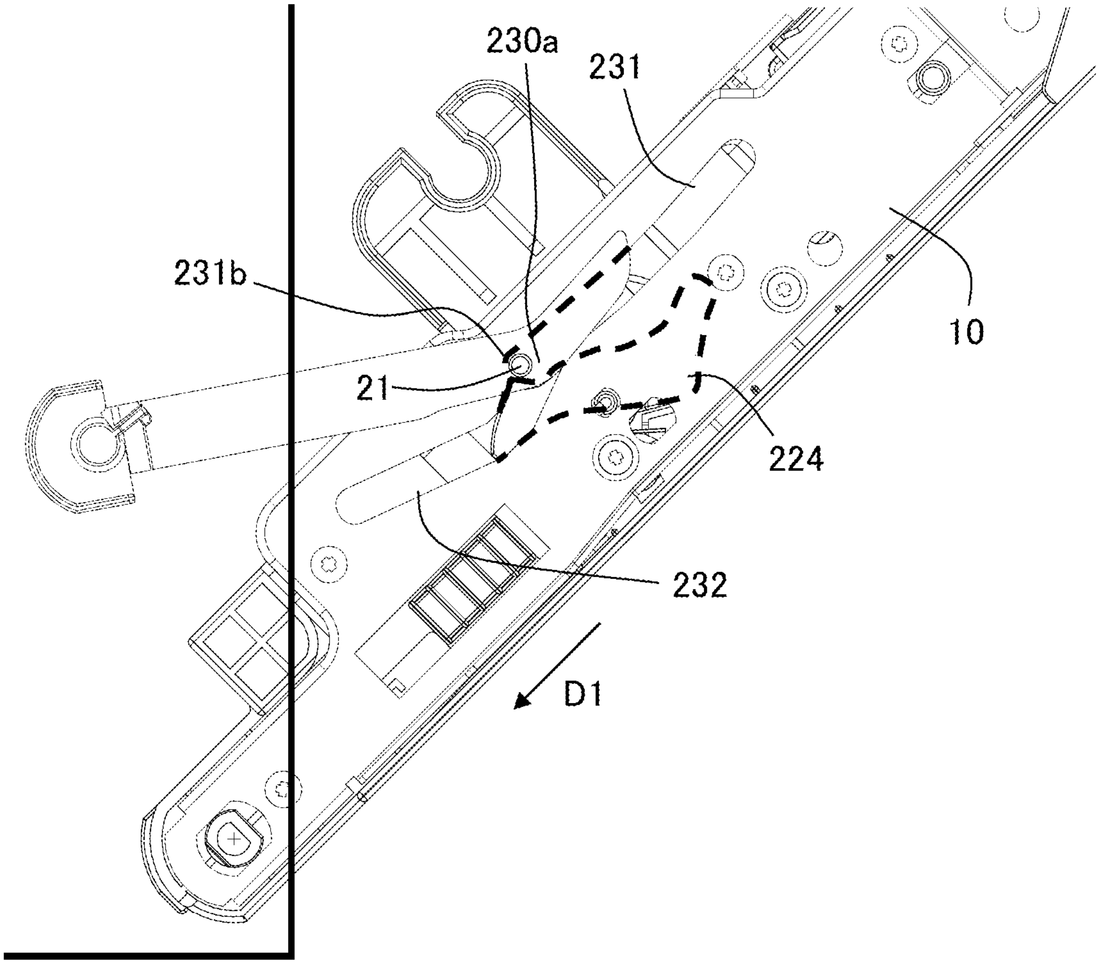
FIG. 23 is a front view of a state where the cover according to the third embodiment is positioned at a first opened position.
Figure 24:
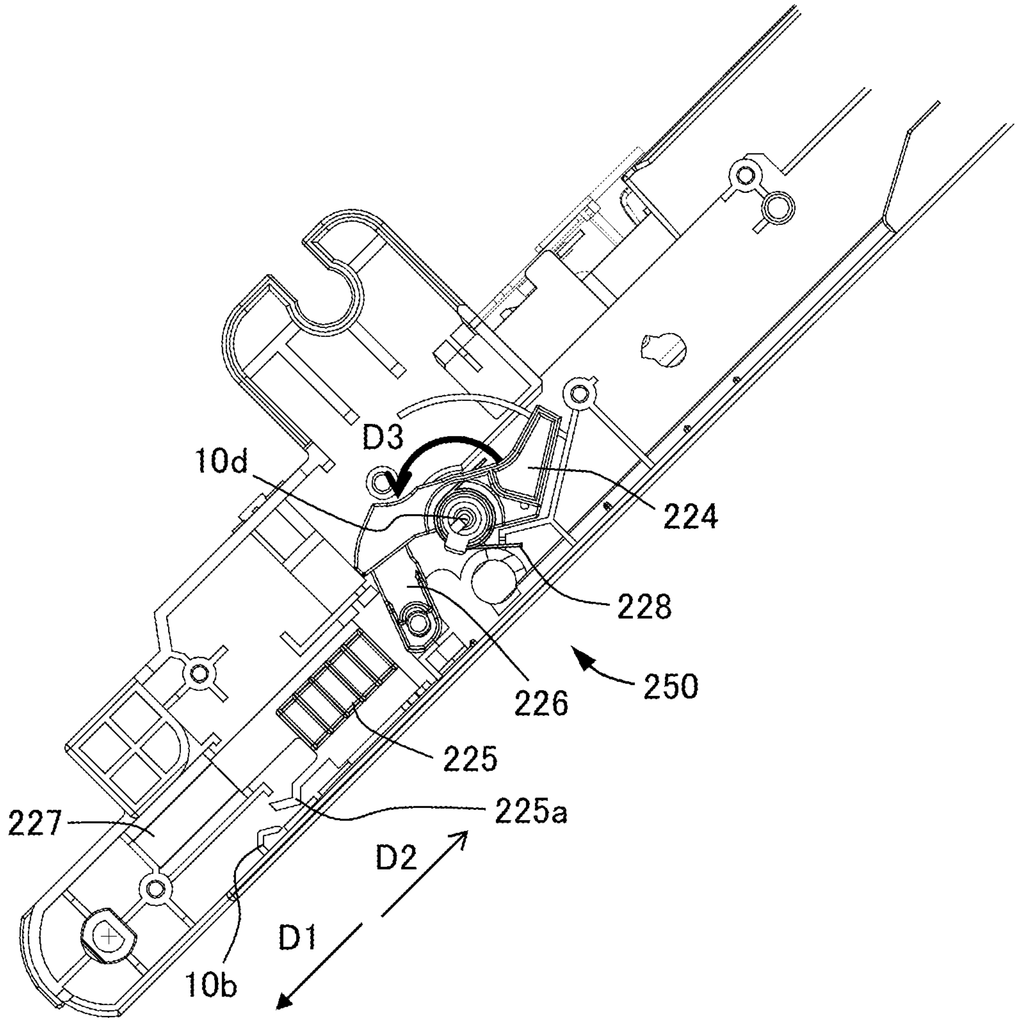
FIG. 24 is a front view of an internal configuration in a state where the cover according to the third embodiment is positioned at the first opened position.

As illustrated in FIG. 23, in a state where the cover 10 is in a first opened position, the slide shaft 21 is regulated from being guided toward a second path 232 by the lock portion 224 at a branch portion 230*a* of the guide portion 230. When the switch 225 is operated toward an arrow D1 direction from this state, the switch 225 is changed from the first operating position to the second operating position, and as illustrated in FIG. 24, a retained state is realized by a switch pawl portion 225*a* being engaged to a projected portion 10*b* of the cover 10. Further, by operating the switch 225, a moment of rotation in a D3 direction, i.e., first rotating direction, occurs about the lock portion rotation shaft 10*d* to the lock portion 224 through the link 226, and the lock portion 224 moves to a position where the slide shaft 21 is not regulated. That is, by operating the switch 225 to be moved from the first operating position to the second operating position, the path switching mechanism 250 is switched from the first state to the second state.

A first spring 227 is a compression coil spring which is disposed to constantly urge the switch 225 toward the direction D2 to ensure the regulated state of the lock portion 224, and it is desirably provided, though not indispensable. That is, the first spring 227 is an example of an urging portion, and urges the switch 225 from the second operating position toward the first operating position such that the path switching mechanism 250 is maintained at the first state. The user operates the switch 225 from the first operating position to the second operating position against the urging force applied by the first spring 227, by which the retention of the path switching mechanism 250 at the first state is cancelled. The first spring 227 is not limited to the compression coil spring, and a unit other than the spring may be provided to elastically engage the switch 225 and the cover 10.

Figure 28:
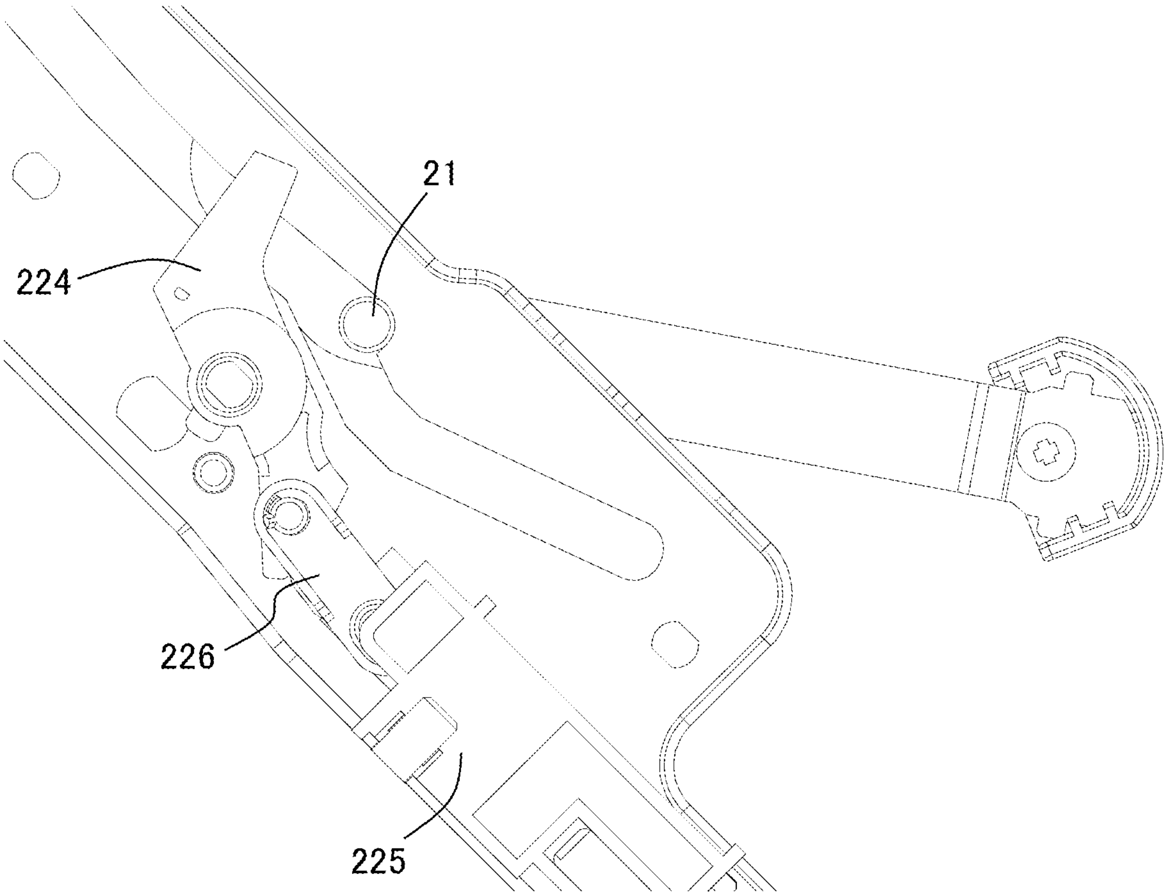
FIG. 28 is an explanatory view in a state where the cover according to the third embodiment is moved from the first opened position to the second opened position.

A second spring 228 is provided with the aim to aid the operation of the switch 225, by which a moment of rotation in a direction D3 occurs to the lock portion 224, which applies a force in a D1 direction to the switch 225 through the link 226, to thereby reduce the force necessary for operation. Therefore, the second spring is preferably provided, though not indispensable. When the lock portion 224 rotates, the cover 10 and the support arm 20 are in a balanced state and stopped at a first opened position, as illustrated in FIG. 28. By lifting the cover 10 slightly by which the slide shaft 21 separates from the end portion 231*b*, the state of balance is released and the slide shaft 21 is guided toward the second path 232.

Now, the cover 10 will not be guided to the second path 232 immediately after switching the lock portion 224, and the balanced state is maintained. That is, the lock portion 224 merely blocks the second path 232, and the load of the cover 10 is received by the end portion 231*b* provided on the first path 231. Thereby, the only operating force when operating the lock portion 224 is the load that occurs when engaging the switch pawl portion 225*a* to the projected portion 10*b* of the cover 10. By adopting such configuration, the operating force that the user exerts during operation may be reduced.

Figure 25:
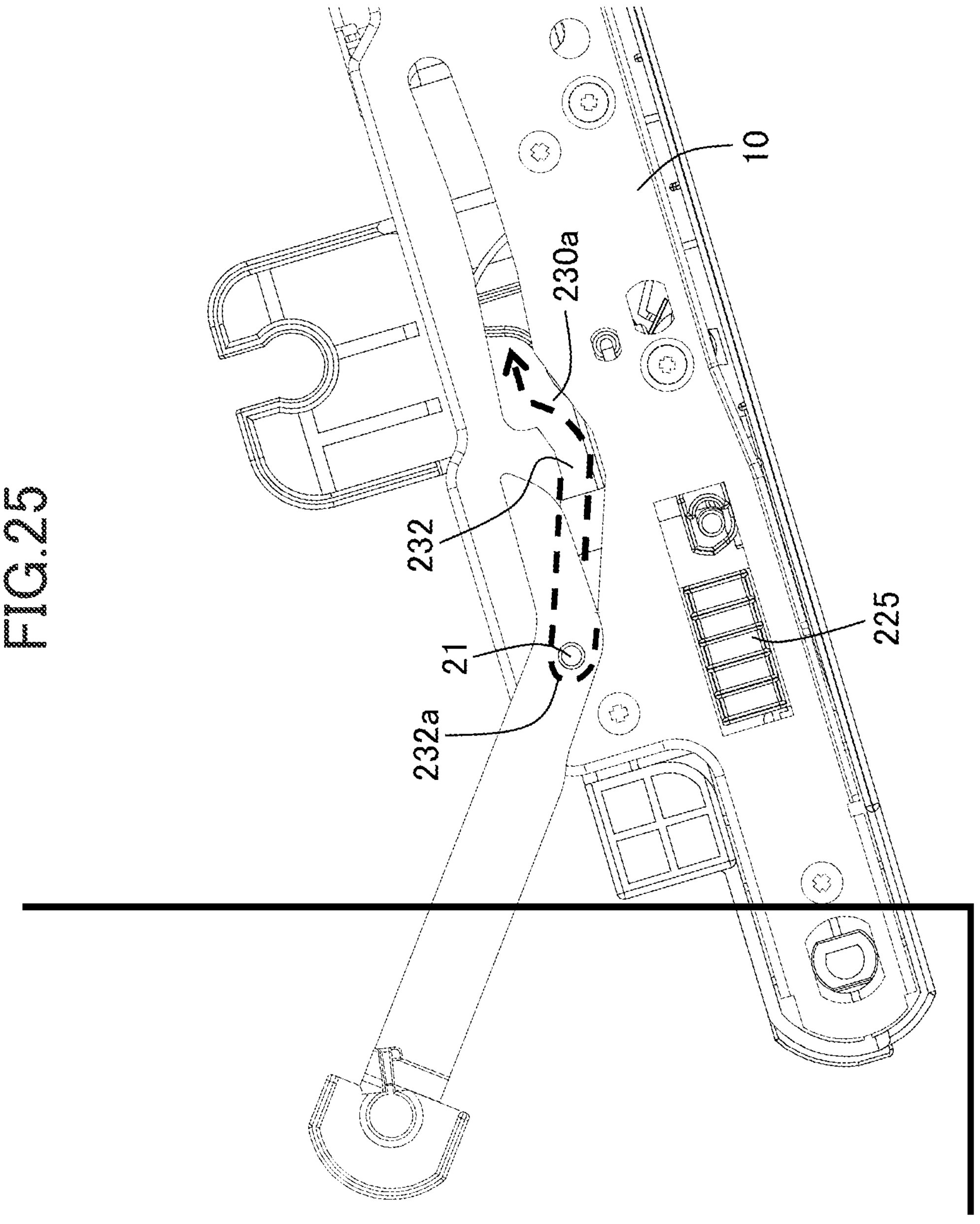
FIG. 25 is a front view of the cover according to the third embodiment positioned at a second opened position.

As illustrated in FIG. 25, the slide shaft 21 guided to the second path 232 reaches an end portion 232*a*, and the support arm 20 and the cover 10 are stopped in the balanced state. Thus, transition to the second opened position is completed. When the slide shaft 21 of the support arm 20 is positioned at the end portion 232*a* of a second guide portion, the support arm 20 is in a balanced state by the rotation shaft 22 and the slide shaft 21 positioned at the end portion 232*a*. The cover 10 is in a second opened state by the cover rotation shaft 18 and the slide shaft 21 positioned at the end portion 232*a* being balanced.

Transition from First and Second Opened Position to Closed Position

Figure 26:
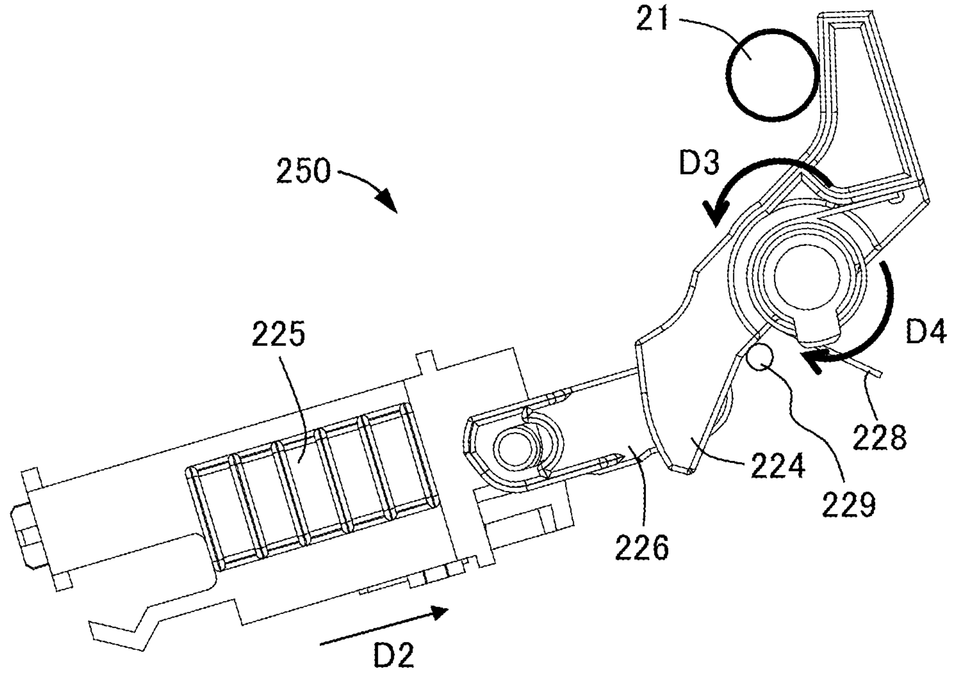
FIG. 26 is an explanatory view of a state where the cover according to the third embodiment is moved from the second opened position to the closed position.

When the user closes the cover 10 from the first opened position illustrated in FIG. 23, the slide shaft 21 is guided by the guide portion 230 to move to the end portion 231*a* and to the closed position. Further, if the user similarly closes the cover 10 from the second opened position illustrated in FIG. 25, the slide shaft 21 is guided by the guide portion 230 to be passed through the branch portion 230*a* and abut against the lock portion 224. When the cover 10 is closed further from this state, as illustrated in FIG. 26, a moment of rotation in a D4 direction occurs to the lock portion 224, along with which the switch 225 and the link 226 are returned to their initial positions in an interlocked manner, and the slide shaft 21 is guided by the guide portion 230 to the end portion 231*a* and transited to the closed position. The D4 direction is a second rotating direction that is a direction opposite to the D3 direction. That is, by rotating the cover 10 from the second angle to the closed position, the path switching mechanism 250 is switched from the second state to the first state. As described, since the cover 10 may be transited to the closed position by simply closing the cover 10, the action of the user operating the switch 225 before closing the door can be omitted.

Configuration of Measures Against Erroneous Operation in Second Opened Position

Figure 27:
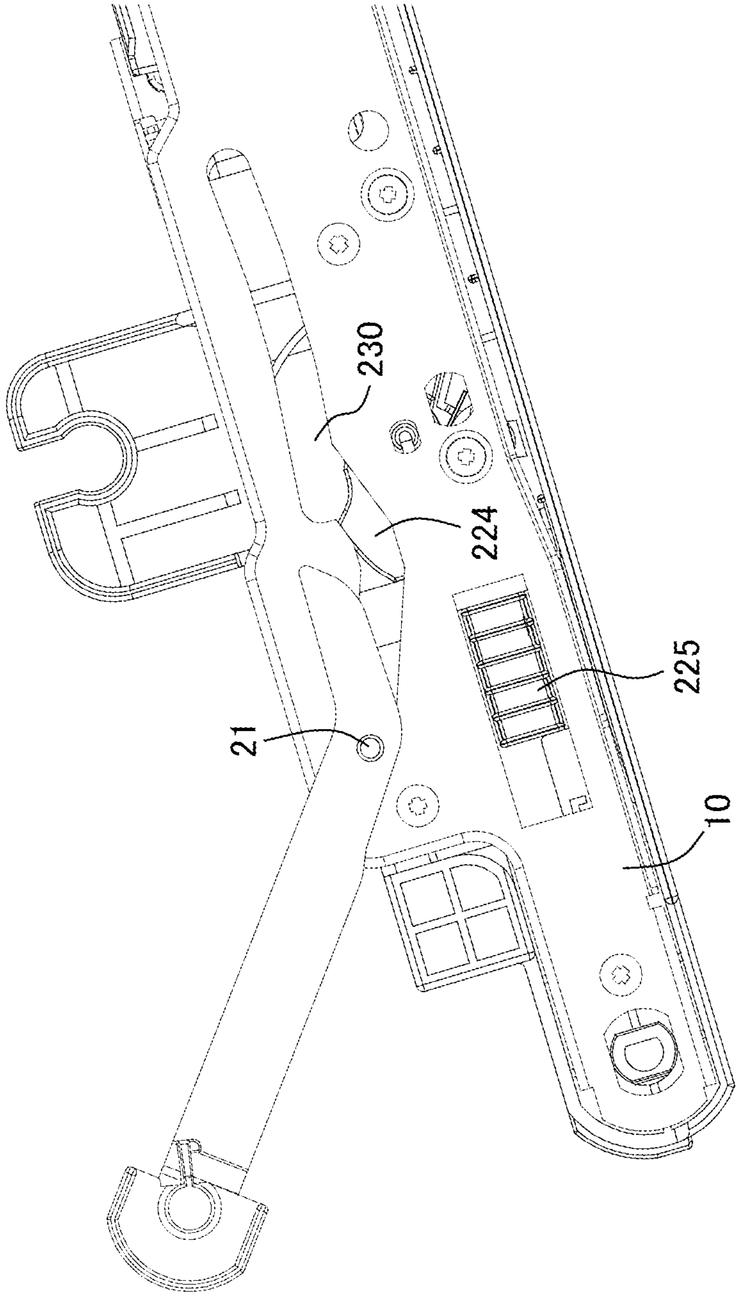
FIG. 27 is an explanatory view illustrating a configuration for preventing erroneous operation of the cover according to the third embodiment.

When the switch 225 is used for opening the path switching mechanism 250, the user can operate the switch intuitively, while the path switching mechanism 250 may be damaged through unintentional switch operation by the user due to a reversible configuration of the switch 225, which is one characteristic property of the switch 225. That is, in a state where the cover 10 is in the second opened position illustrated in FIG. 25, if the switch 225 is operated in the D2 direction and returned to the first operating position, the state of FIG. 27 is realized, and the lock portion 224 will be positioned in midway of the guide portion 230 forming a wall. In that case, if the user closes the cover 10 without performing an operation to return the switch 225 to the second operating position, the slide shaft 21 and the lock portion 224 will collide against each other and may be damaged. In a configuration where the drawback of damaging risk is not solved, the switching of opening angles will be limited to trained operators, such that a mechanism that may be operated intuitively and safely by the user is desired. Therefore, the present embodiment regulates the switch 225 from being returned from the second operating position to the first operating position.

In the present embodiment, in a state where the cover 10 is in the second opened position illustrated in FIG. 25, if the switch 225 is operated in the D2 direction toward the returning direction, a moment of rotation in the D3 direction as illustrated in FIG. 26 occurs, such that the lock portion 224 will not return to the initial position. Specifically, the lock portion 224 is provided rotatably between a regulating position where the slide shaft 21 positioned in the first path 231 is regulated from entering the second path 232 and a communicating position where the first path 231 and the second path 232 are communicated. When the switch 225 is positioned at the first operating position, the lock portion 224 is positioned at the regulating position, and when the switch 225 is positioned at the second operating position, the lock portion 224 is positioned at the communicating position. When the switch 225 is operated to be moved from the second operating position to the first operating position, the lock portion 224 is urged to the D3 direction, i.e., first rotating direction, toward the communicating position from the regulating position. In this state, a stopper 229 regulates the lock portion 224 from rotating to the D3 direction from the communicating position. That is, when the switch 225 is positioned at the second operating position, the switch 225 may tend to move in the D2 direction and the lock portion 224 may tend to rotate in the D3 direction, but such movement is regulated by the stopper 229.

As described, according to the present embodiment, the stopper 229 is an example of an operation regulating portion, which is switched between a regulating state in which the switch 225 is regulated from being moved from the second operating position to the first operating position, i.e., state illustrated in FIG. 26, and an allowable state in which the slide shaft 21 is allowed to move from the first path 31 to the second path 32, i.e., state illustrated in FIG. 21. Then, when the switch 225 is operated to be moved from the first operating position to the second operating position, the lock portion 224 abuts against the stopper 229 and the stopper 229 will be in the regulating state. Further, by rotating the cover 10 from the second angle to the closed position, the lock portion 224 separates from the stopper 229, the stopper 229 is switched from the regulating state to the allowable state, and the switch 225 is moved from the second operating position to the first operating position.

As described, according to the mage forming apparatus 1 of the present embodiment, when switching the cover 10 from the first opened position to the second opened position, the switching is enabled through a switching operation. When the switch 225 is positioned at the second operating position, if the user unintentionally operates the switch, the switch 225 will not return to the first operating position. As described, since the configuration enables the cover 10 to be moved to the closed position only through the operation of closing the cover 10, erroneous operation of the switch 225 will not cause the cover 10 to be closed forcibly and cause damage of members, such that intuitive operation is enabled.

Fourth Embodiment

Next, a fourth embodiment of the present invention will be described in detail with reference to FIGS. 29A to 31. The configuration of the present embodiment differs from the first embodiment in that a function of retreating a fixing member 40 from a first state is provided. Other configurations are similar to the first embodiment, such that the same reference numbers are assigned to corresponding components, and detailed descriptions thereof are omitted.

Configuration Related to Opening and Closing of Cover

The support arm 20 includes the slide shaft 21 connecting the support arm 20 and the cover 10, and the rotation shaft 22 connecting the support arm 20 and the image forming apparatus 1. The cover 10 is provided with a guide portion 330 that guides the support arm 20, and the angle, i.e., position and orientation, of the support arm 20 is determined by the position of the slide shaft 21 on the guide portion 330, and simultaneously, the opening angle of the cover 10 is determined.

Figure 29A:
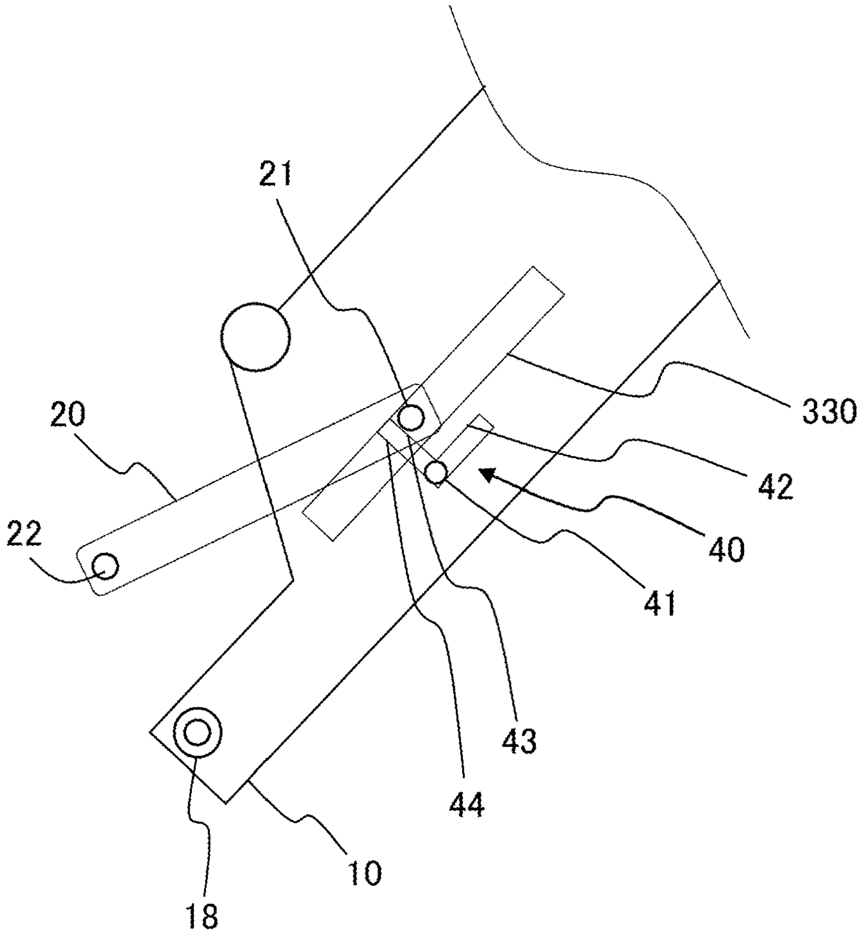
FIG. 29A is a front view of a cover according to a fourth embodiment in a state where a fixing member is in a first state.

FIG. 29A is an enlarged view illustrating the cover 10 in a state opened to the first angle from a front side of the apparatus. As illustrated in FIG. 29A, the fixing member 40 is provided to retain the cover 10 at the first angle. The fixing member 40 is provided on the cover 10 and the fixing member 40 contacts the slide shaft 21 guided by the guide portion 330 by a support surface 43, and retains the slide shaft 21 at the position illustrated in FIG. 29A. The fixing member 40 is supported on the cover 10 in a manner rotatable from the state illustrated in FIG. 29A, i.e., first state, about a fixing member rotation shaft 41, and the fixing member 40 is retained by a rotation regulation portion (not shown) so as not to rotate in a counterclockwise direction. According thereto, the support arm 20 is in a state balanced by the rotation shaft 22 and the slide shaft 21 in contact with the support surface 43, and the cover 10 is also retained at the first angle by the cover rotation shaft 18 and the slide shaft 21 in contact with the support surface 43 being balanced.

Figure 29B:
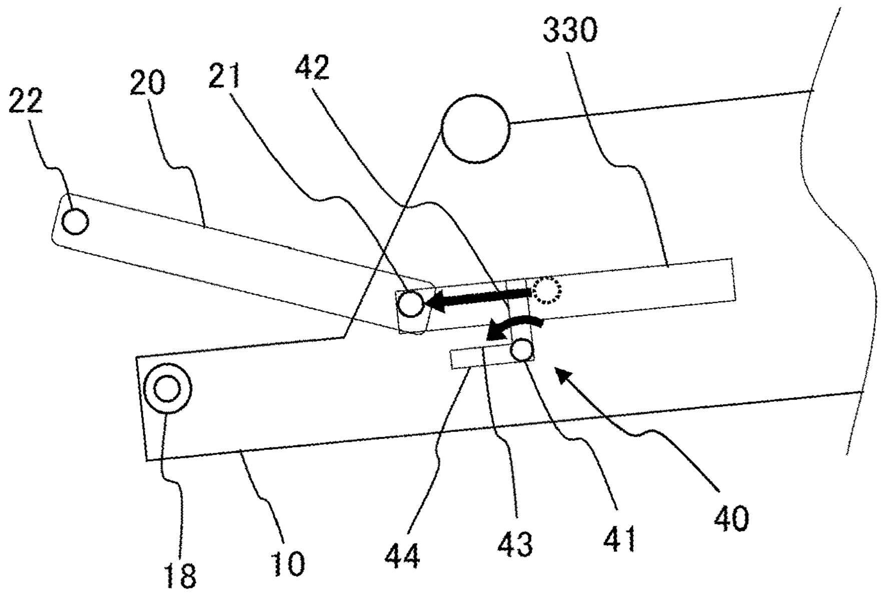
FIG. 29B is a front view of the cover according to a fourth embodiment in a state where the fixing member is in a second state.

FIG. 29B is an enlarged view illustrating from a front side of the apparatus a state in which the fixing member 40 is moved and the cover 10 is transited from the first angle to the second angle. If the slide shaft 21 of the support arm 20 is moved to an end portion of the guide portion 330 illustrated in FIG. 29B, the support arm 20 is in a balanced state by the rotation shaft 22 and the slide shaft 21. The cover 10 is retained at the second angle by the cover rotation shaft 18 and the slide shaft 21 positioned at the end portion of the guide portion 330 being balanced. The fixing member 40 has the state of FIG. 29B set as the second state.

Figure 30A:
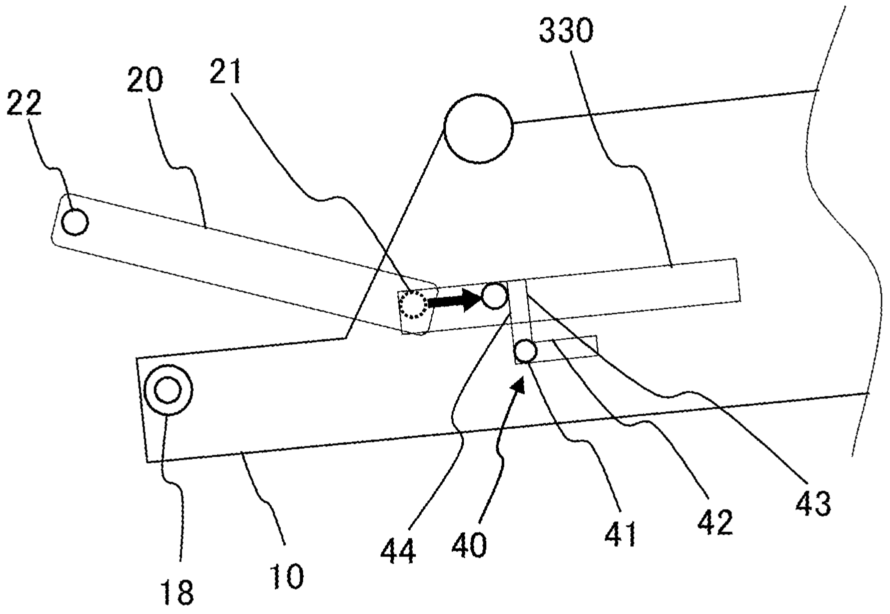
FIG. 30A is a front view of the cover according to a fourth embodiment in a state where the fixing member has been returned from the second state to the first state.
Figure 30B:
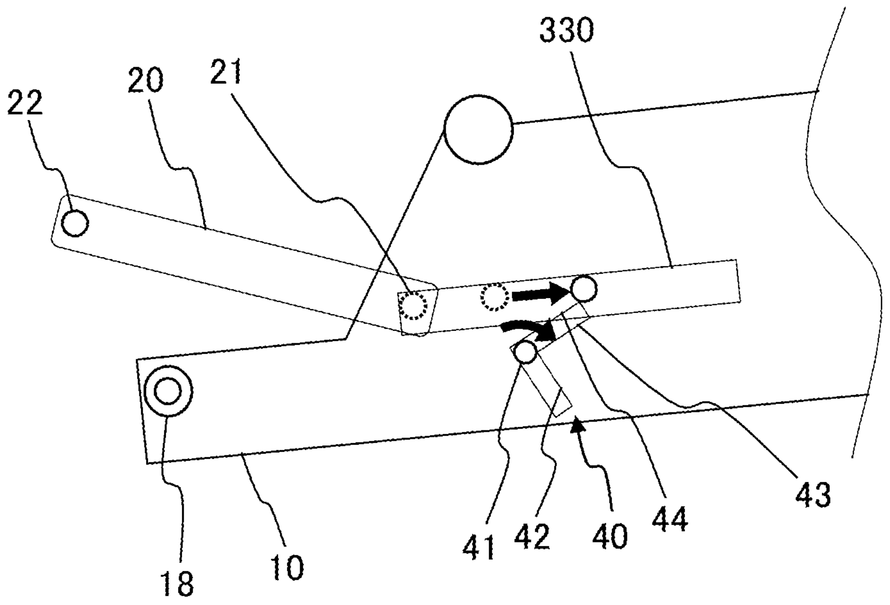
FIG. 30B is a front view of the cover according to a fourth embodiment in a state where the fixing member has retreated from the first state.

In order to open the cover 10 from the first angle to the second angle, that is, in order to move the slide shaft 21, the rotation stop portion, i.e., rotation lock, not shown of the fixing member 40 should be moved by the operator. In this state, the rotation stop portion may be movably supported on the cover 10 or may be removably disposed on the cover 10. As described above, by moving the rotation stop portion, the fixing member 40 will be in a state rotatable in the counterclockwise direction, and along with the rotation of the fixing member 40, the slide shaft 21 is moved within the guide portion 330 to a position where the cover 10 is retained at the second angle. In the present embodiment, after the slide shaft 21 moves beyond the fixing member 40 toward the end portion of the guide portion 330 illustrated in FIG. 29B, the fixing member 40 is designed be returned automatically to the first state illustrated in FIG. 29A Closing Operation from Second Position FIG. 30A is an enlarged view illustrating from a front side of the apparatus a movement of the slide shaft 21 when the cover 10 is closed from the second angle to the first angle, and FIG. 30B is an enlarged view illustrating from the front side of the apparatus a movement of the slide shaft 21 and the fixing member 40 when the cover 10 is closed from the second angle to the first angle. Actually, when the slide shaft 21 is moved, the movement of the slide shaft 21 is interlocked with the movement in which the cover 10 is closed from the second angle to the first angle, such that the angle is further closed toward the body of the image forming apparatus 1 than the opening angle of the cover 10 illustrated in FIG. 30A. However, the movement of the slide shaft 21 and the fixing member 40 is relevant to the present embodiment, such that further movement of the cover 10 is omitted.

In the present embodiment, after the slide shaft 21 passes the fixing member 40 toward the end portion of the guide portion 330 illustrated in FIG. 29B, the fixing member 40 is designed to be automatically returned to the state illustrated in FIG. 29A. In this case, in a general conventional configuration, as illustrated in FIG. 30A, the slide shaft 21 comes into contact with a non-support surface 44 of the fixing member 40 and the fixing member 40 will not move, such that the slide shaft 21 is blocked in this position. If the cover 10 is forcibly closed from this state, the fixing member 40, the support arm 20, or the cover 10 may be deformed or damaged.

Therefore, according to the present embodiment, as illustrated in FIG. 30B, the fixing member 40 is supported rotatably further toward the clockwise direction from the state of FIG. 30A. Thereby, when the slide shaft 21 moves from the state of FIG. 30A toward the closing direction of the cover 10, the non-support surface 44 is pushed by the slide shaft 21 abutted thereagainst, and the fixing member 40 rotates in the clockwise direction in an interlocked manner. That is, since the movement of the slide shaft 21 is not regulated by the fixing member 40, drawbacks such as deformation and damage may be suppressed even if the cover 10 is closed from the state of FIG. 30A. Moreover, as illustrated in FIG. 30B, the fixing member 40 rotates in the clockwise direction and the slide shaft 21 moves to a position where the slide shaft 21 and the non-support surface 44 are separated. Thereafter, the fixing member 40 is caused to automatically rotate in the counterclockwise direction to the first state illustrated in FIG. 30A by an elastic member not shown, such as a spring. Thereby, the user is not required to return the fixing member 40 to the first state illustrated in FIG. 30A, and next time when the cover 10 is opened from the closed state, the cover 10 can be retained at the first angle without fail.

As described above, according to the image forming apparatus 1 of the present embodiment, the fixing member 40 in the second state automatically moves to the first state, such that the user is required to simply close the cover 10, according to which the operability may be enhanced.

Figure 31:
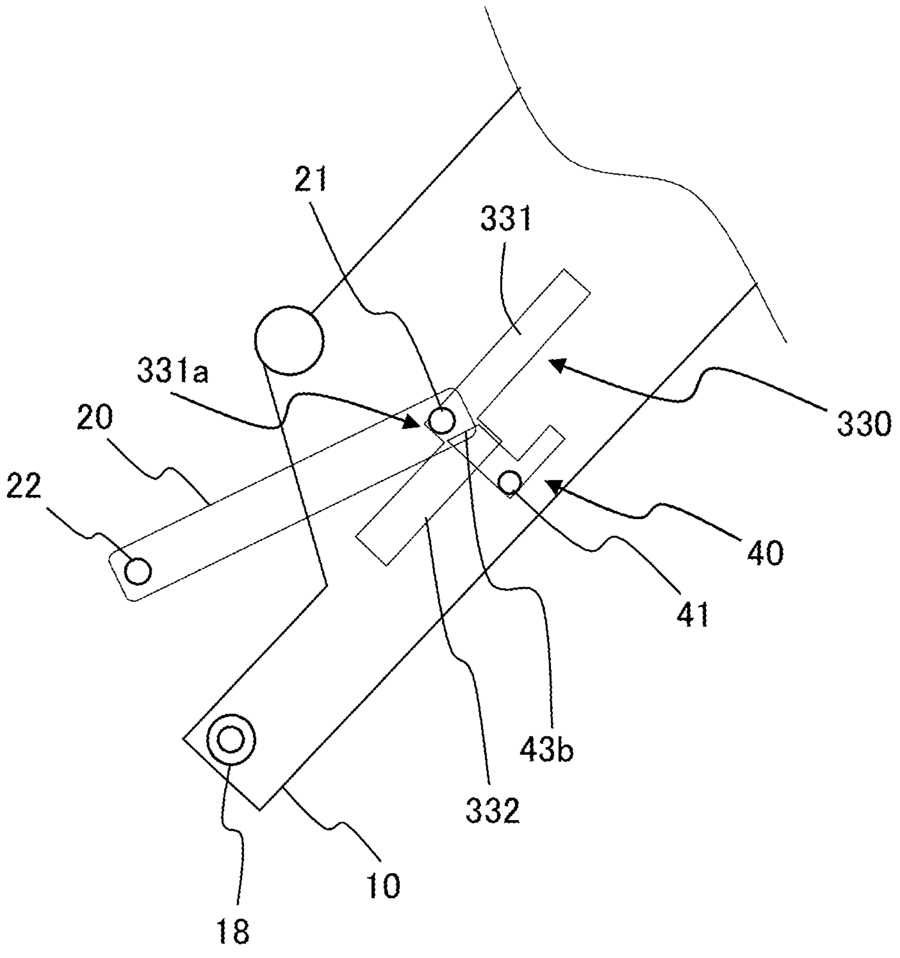
FIG. 31 is a front view of a cover according to a modified example of the fourth embodiment in which a fixing member is in a first state.

According to the image forming apparatus 1 of the above-mentioned embodiment, a case in which the guide portion 330 is linear has been described, but the present technique is not limited thereto. For example, as illustrated in FIG. 31, similar to the first to third embodiments, the first path 331 and the second path 332 may adopt stepped shapes. In this case, when the slide shaft 21 is positioned at an end portion 331*a* of the first path 331, the support arm 20 is in a balanced state by the rotation shaft 22 and the slide shaft 21 positioned at the end portion 331*a*. The cover 10 is retained at the first angle by the cover rotation shaft 18 and the slide shaft 21 positioned at the end portion 331*a* being balanced. According to the configuration illustrated in FIG. 31, when the cover 10 is opened to the first angle from the state closed with respect to the image forming apparatus 1, the fixing member 40 closes a connecting portion between the first path 331 and the second path 332 such that the slide shaft 21 is prevented from entering the second path 332. That is, the slide shaft 21 is guided toward the end portion 331*a* by a guide surface 43*b* of the fixing member 40. Thereby, in a state where the cover 10 is retained at the first angle, the slide shaft 21 maintains a state where load is not applied to the fixing member 40. By adopting this configuration, it becomes possible to reduce the stiffness and strength of the fixing member 40, that is, it becomes possible to use a small member formed of a lightweight material, such that the image forming apparatus 1 can be downsized with reduced weight.

According to the image forming apparatus 1 of the above-mentioned embodiment, after reaching the second state and the slide shaft 21 has passed the fixing member 40 toward the end portion of the guide portion 330 illustrated in FIG. 29B, the fixing member 40 is configured to return automatically to the first state illustrated in FIG. 29A. However, the present technique is not limited thereto, and for example, similar to the first to third embodiments, the fixing member 40 may be caused to maintain the second state after the slide shaft 21 has passed the fixing member 40 toward the end portion of the guide portion 330 illustrated in FIG. 29B. In that case, when closing the cover 10 from the second angle to the first angle, the slide shaft 21 moves within the guide portion 330 and abuts against a returning surface 42 of the fixing member 40. Further, by the fixing member 40 rotating in the clockwise direction in an interlocked manner with the movement of the slide shaft 21, the fixing member 40 is transited to the first state illustrated in FIG. 29A. Then, when the user returns the rotation regulation portion (not shown), the fixing member 40 will no longer rotate in the counterclockwise direction from the first state illustrated in FIG. 29A, and the cover 10 may be retained at the first angle. Of course, by closing the cover 10 further from this state toward the image forming apparatus 1, the cover 10 may be closed completely. However, even according to this configuration, the rotation regulation portion 45 may be returned to the clockwise direction due to external forces applied by an operator or by vibration and collision, before the operation of closing the cover 10 from the second angle to the first angle as illustrated in FIG. 30A is performed. In that case, according to the present embodiment, when the slide shaft 21 moves from the state of FIG. 30A toward the closing direction of the cover 10, the non-support surface 44 is pushed by the slide shaft 21 in contact therewith, and the fixing member 40 rotates in the clockwise direction in an interlocked manner, such that the cover 10 can be closed.

Fifth Embodiment

Next, a fifth embodiment of the present invention will be described in detail with reference to FIG. 32. The configuration of the present embodiment differs from the fourth embodiment in that it has a function to retreat from the first state by having a contact portion 60 of the fixing member 40 rotate. Other configurations are similar to the fourth embodiment, such that the same reference numbers are assigned to corresponding components, and detailed descriptions thereof are omitted.

Figure 32A:
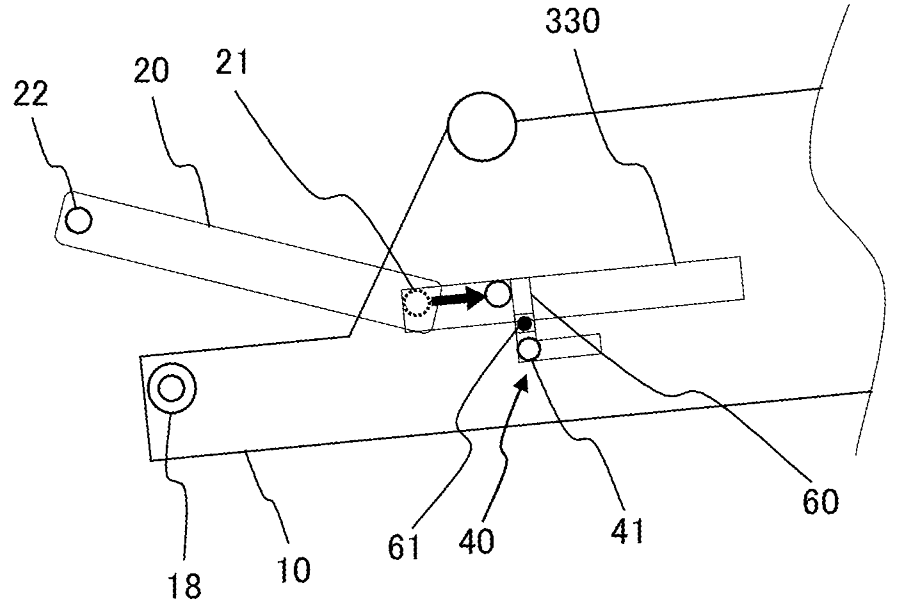
FIG. 32A is a front view of a cover according to a fifth embodiment in which a fixing member has been returned from a second state to a first state.
Figure 32B:
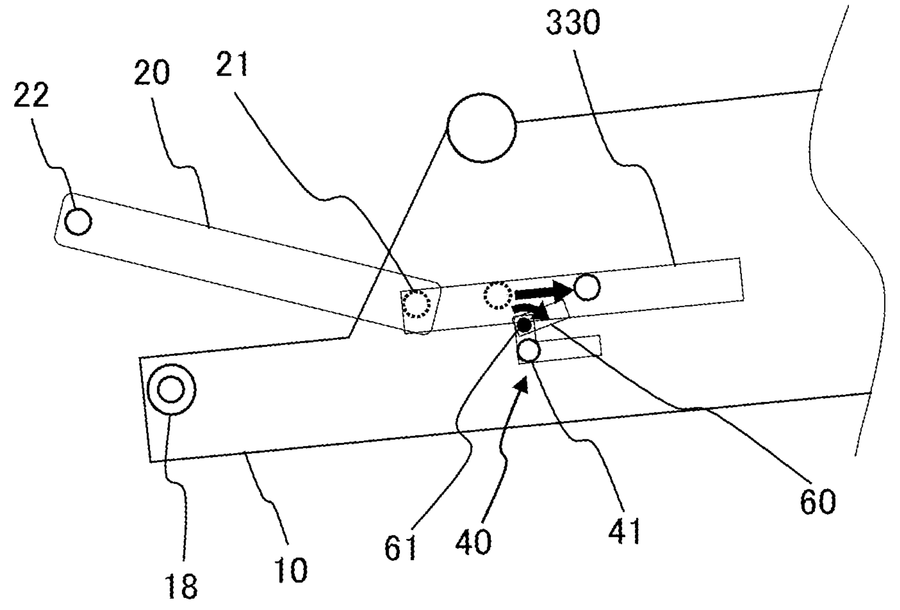
FIG. 32B is a front view of the cover according to the fifth embodiment in a state where a movable member of a fixing member has been rotated.

FIG. 32A is an enlarged view illustrating from a front side of the apparatus a movement of the slide shaft 21 in a state where the cover 10 according to the present embodiment is closed from a second angle to a first angle. FIG. 32B is an enlarged view illustrating from a front side of the apparatus a movement of the slide shaft 21 and the fixing member 40 in a state where the cover 10 is closed from the second angle to the first angle. As illustrated in FIG. 32A, the contact portion 60 is provided on the fixing member 40. The contact portion 60 is supported rotatably about a rotation shaft 61 with respect to the fixing member 40, and rotation thereof is restricted by a rotation stopper not shown so as not to rotate in the D3 direction with respect to the fixing member 40 from the state of FIG. 32A. Thereby, when the slide shaft 21 moves from the state of FIG. 32A toward the direction closing the cover 10, the contact portion 60 is pushed by the slide shaft 21 in contact therewith, and the contact portion 60 is rotated in an interlocked manner in the D4 direction. That is, since the movement of the slide shaft 21 is not restricted by the contact portion 60, the cover 10 can be closed from the state of FIG. 32A.

Furthermore, as illustrated in FIG. 32B, the contact portion 60 rotates in the clockwise direction, and the slide shaft 21 is moved to a position where the slide shaft 21 and the contact portion 60 are separated. Thereafter, the contact portion 60 is rotated in the counterclockwise direction with respect to the fixing member 40 automatically to the position illustrated in FIG. 32A by an elastic member not shown, such as a spring. Thereby, the user is not required to return the contact portion 60 to the state of FIG. 32A, and the cover 10 can be retained at the first angle without fail when the cover 10 is opened for the next time from the closed state.

According to the present invention, it becomes possible to simply the operability when opening the cover in two stages.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-177475, filed Nov. 4, 2022 which is hereby incorporated by reference herein in its entirety.

What is claimed is:

1. An image forming apparatus comprising:

an image forming unit configured to form an image on a sheet;

a casing accommodating the image forming unit;

a door configured to be opened and closed by being rotated with respect to the casing, and configured to be rotated to a first opened position where the door is inclined by a first angle with respect to a closed position where the casing is closed, and to a second opened position where the door is inclined by a second angle that is greater than the first angle with respect to the closed position;

a switching portion configured to be switched between a first state in which the door is rotatable from the closed position to the first opened position, and a second state in which the door is rotatable at least from the first opened position to the second opened position;

an operating portion configured to be moved to a first operating position in which the switching portion is set to the first state and to a second operating position in which the switching portion is set to the second state such that in a case where the operating portion is moved from the first operating position to the second operating position, in a state where the door is at the first opened position, the door remains at the first opened position; and an operation regulating portion configured to regulate movement of the operating portion from the second operating position to the first operating position.

2. The image forming apparatus according to claim 1, wherein, by operating the operating portion to be moved from the first operating position to the second operating position, the switching portion is switched from the first state to the second state, and wherein, by rotating the door from the second opened position to the closed position, the switching portion is switched from the second state to the first state.

3. The image forming apparatus according to claim 2, wherein, by rotating the door from the second opened position to the closed position, the operation regulating portion is switched from a regulating state to an allowable state, the regulating state being a state in which the operating portion is regulated not to move from the second operating position to the first operating position, the allowable state being a state in which the operating portion is allowable to move from the second operating position to the first operating position, and the operating portion is moved from the second operating position to the first operating position.

4. The image forming apparatus according to claim 1, wherein the switching portion includes a guide portion formed on the door, a support member provided swingably to the casing, including a guided portion guided by the guide portion, and supporting the door in an inclined state on the casing, and a regulation portion configured to regulate movement of the guided portion, wherein the guide portion includes a first area in which the door is rotatable from the closed position to the first opened position by having the guided portion guided, and a second area in which the door is rotatable from a position where the door is opened more than the first opened position to the second opened position by having the guided portion guided, and wherein, in a state where the guided portion is positioned in the first area, the regulation portion is configured to regulate the guided portion not to enter the second area of the guide portion such that the switching portion is set to the first state, and the regulation portion is configured to communicate the first area and the second area of the guide portion such that the switching portion is set to the second state.

5. The image forming apparatus according to claim 4, wherein the regulation portion is provided rotatably at a regulating position where the guided portion positioned in the first area is regulated not to enter the second area of the guide portion, and a communicating position where the first area and the second area of the guide portion are communicated, wherein, in a state where the operating portion is positioned at the first operating position, the regulation portion is positioned at the regulating position, wherein, in a state where the operating portion is positioned at the second operating position, the regulation portion is positioned at the communicating position, wherein, in a state where the operating portion is operated to be moved from the second operating position to the first operating position, the regulation portion is urged to a first rotating direction from the regulating position toward the communicating position, and wherein the operation regulating portion is a stopper configured to regulate the regulation portion not to rotate from the communicating position toward the first rotating direction in a regulating state in which the operating portion is regulated not to move from the second operating position to the first operating position.

6. The image forming apparatus according to claim 5, wherein the regulation portion includes a contact portion configured to intersect a trajectory of the guided portion in the first area of the guide portion in a state where the switching portion is in the second state, and wherein, in a state where the guided portion is positioned in the second area of the guide portion, along with the door being rotated toward the closed position, the regulation portion is rotated in a second rotating direction opposite to the first rotating direction by the guided portion coming in contact with and pushing the contact portion, then the regulation portion is moved from the communicating position to the regulating position such that the switching portion is switched from the second state to the first state.

7. The image forming apparatus according to claim 4, further comprising:

an urging portion configured to urge the operating portion from the second operating position toward the first operating position such that the switching portion is maintained in the first state, wherein the switching portion is configured to be released from being maintained in the first state by operating the operating portion from the first operating position to the second operating position against an urging force applied by the urging portion.

8. The image forming apparatus according to claim 4, wherein the guide portion includes a receiving portion configured to receive a load of the door acting on the guided portion in a state where the switching portion is in the first state and the door is positioned at the first opened position.

9. The image forming apparatus according to claim 1, wherein the operating portion is provided at a portion other than a portion serving as an external wall of the casing of the door in the closed position.

10. The image forming apparatus according to claim 1, wherein the door is configured to form a side wall portion of the casing in the closed position, and configured rotatably about a rotation shaft in a horizontal direction at a lower part of the door.

11. The image forming apparatus according to claim 1, wherein the switching portion includes a regulation portion configured to regulate movement of the door to the second opened position.

12. An image forming apparatus comprising:

an image forming unit configured to form an image on a sheet;

a casing accommodating the image forming unit;

a door configured to be opened and closed with respect to the casing, and configured to be moved to a first opened position and a second opened position, the first opened position being a position where the door is inclined by a first angle with respect to a closed position where the casing is closed and a sheet conveyance path is formed, the second opened position being a position where the door is inclined by a second angle that is greater than the first angle with respect to the closed position to expose the sheet conveyance path;

a connecting member configured to connected to the casing and the door;

a guide member provided on the door, the guide member including a first guide configured to guide a guided portion of the connecting member in a case that the door is moved between the closed position and the first opened position, and a second guide branched from the first guide and configured to guide the guided portion of the connecting member in a case that the door is moved to the second opened position;

a regulation portion provided on the door and configured to move independently of the connecting member between a regulating position and an allowing position, wherein the regulation portion positioned at the regulating position is configured to regulate the guided portion of the connecting member to move from the first guide to the second guide in a case that the door is opened, and the regulation portion positioned at the allowing position is configured to allow the guided portion of the connecting member to move from the first guide to the second guide in the case that the door is opened;

an operating portion configured to be moved by an operator to a first operating position in which the regulation portion is set to the regulating position, and a second operating position in which the regulation portion is set to the allowing position; and an operation regulating portion configured to regulate movement of the operating portion from the second operating position to the first operating position in a state where the door is positioned at the second opened position.

13. The image forming apparatus according to claim 12, wherein, by moving the door from the second opened position to the closed position, the operation portion is moved from the second operating position to the first operating position.

14. The image forming apparatus according to claim 12, wherein, in a state where the door is moved from the second opened position to the closed position, the regulation portion is configured to be moved from the allowing position to the regulating position by being pushed by the guided portion.

* * * * *